United States Patent [19]

Billet et al.

[11] Patent Number: 4,697,417
[45] Date of Patent: Oct. 6, 1987

[54] TORSIONAL DAMPING DEVICE HAVING WIDE RANGE CLEARANCE, AND A HYDRAULIC COUPLING HAVING SUCH A TORSIONAL DAMPING DEVICE, IN PARTICULAR FOR A MOTOR VEHICLE

[75] Inventors: René Billet, Lamorlaye; Roland Mousston, Palaiseau; Jean Bionaz, Fontenay-sous-Bois, all of France

[73] Assignee: Valeo, Paris, France

[21] Appl. No.: 796,774

[22] Filed: Nov. 12, 1985

[30] Foreign Application Priority Data

Nov. 16, 1984 [FR] France ................. 84 17493

[51] Int. Cl.⁴ ............................................. F16D 33/00
[52] U.S. Cl. .................................. 60/338; 192/106.2; 464/68
[58] Field of Search ................. 60/338, 344, 345, 346; 192/70.17, 70.18, 106.1, 106.2; 464/67, 68

[56] References Cited

U.S. PATENT DOCUMENTS 3,995,726 12/1976 DeGennes ................ 192/106.2
4,588,058 5/1986 Aliovate ................... 464/68 X

FOREIGN PATENT DOCUMENTS 2282578 3/1976 France .
2526907 11/1983 France .
2120358 11/1983 United Kingdom .

Primary Examiner—Stephen F. Husar
Attorney, Agent, or Firm—Charles E. Brown; Charles A. Brown

[57] ABSTRACT

In a torsional damper device in particular for equipping hydraulic coupling devices, in particular for automotive vehicles, two flanges mesh through meshing means with clearance with a same flange. There is at least one area of axial interpenetration between these flanges.

33 Claims, 52 Drawing Figures

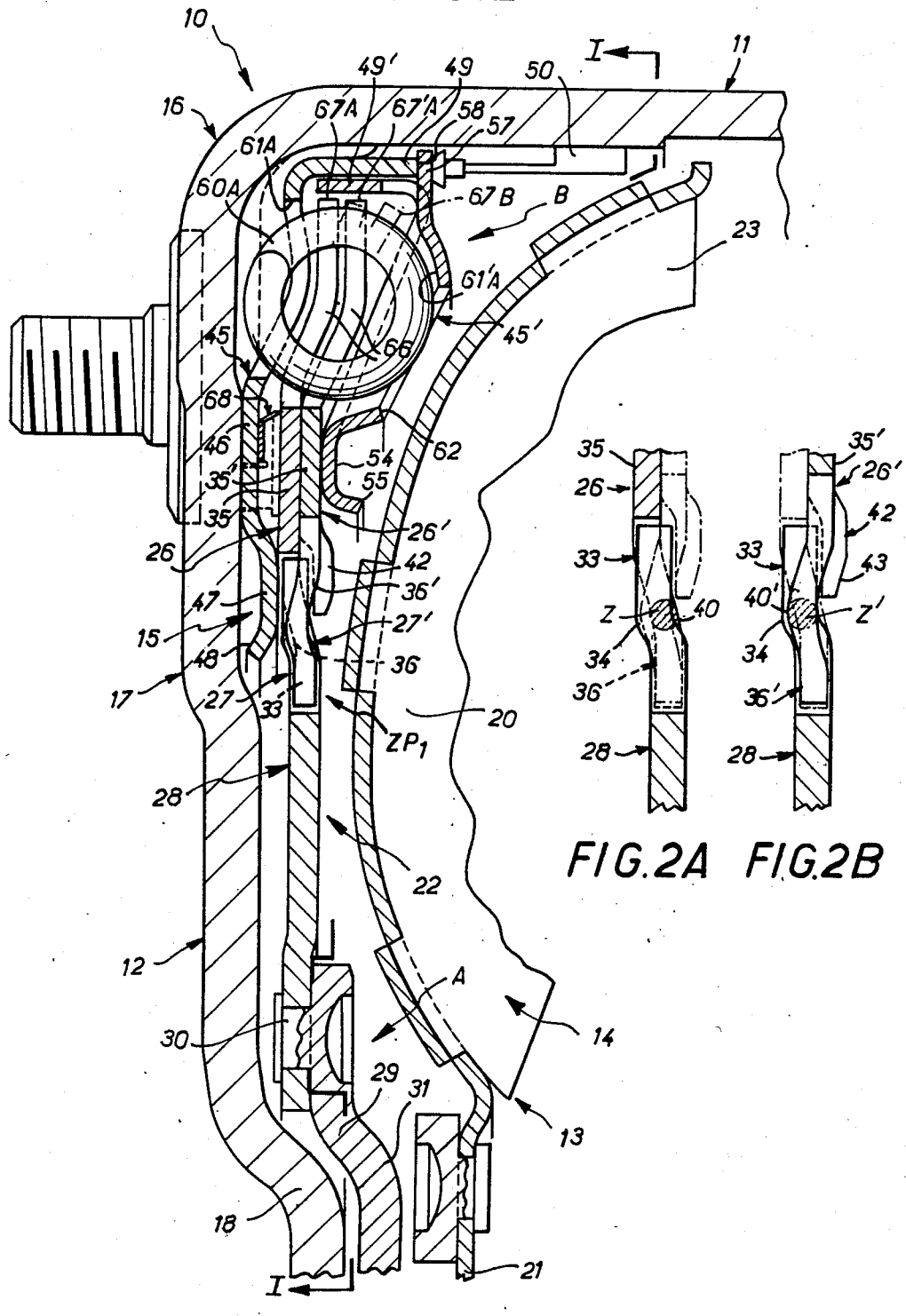

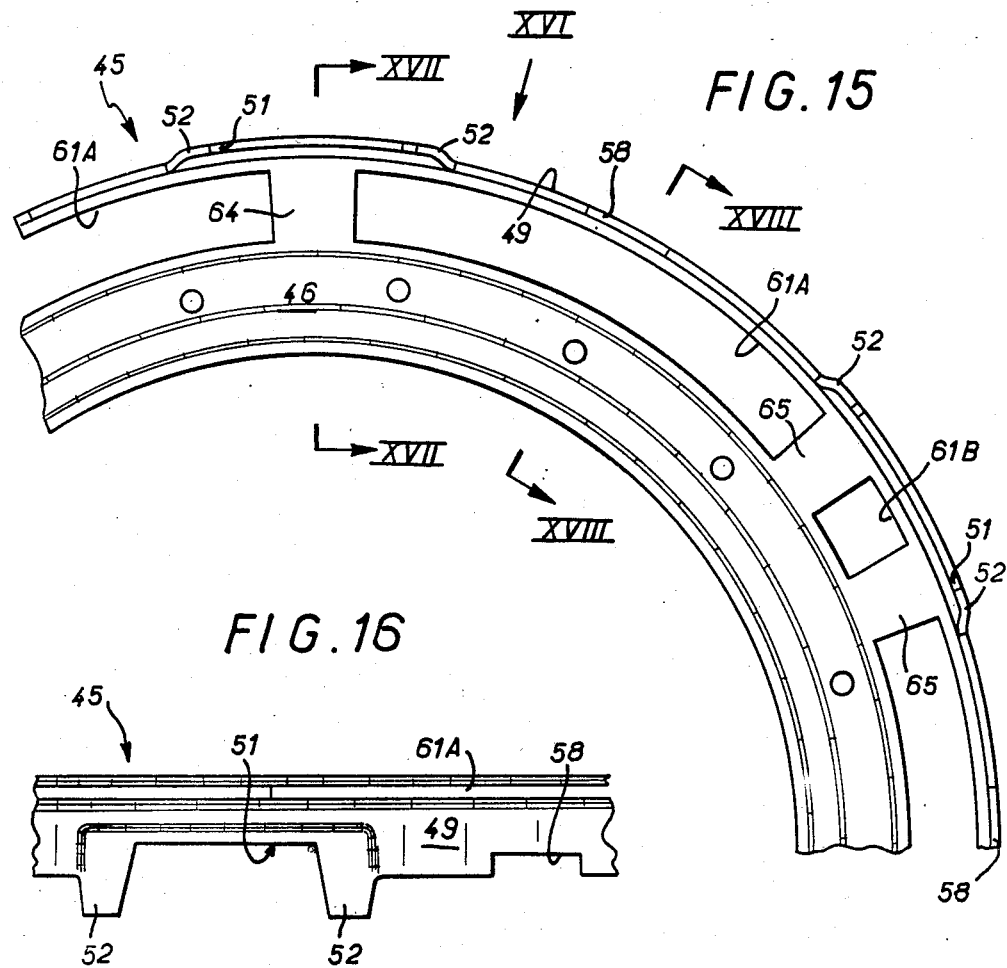

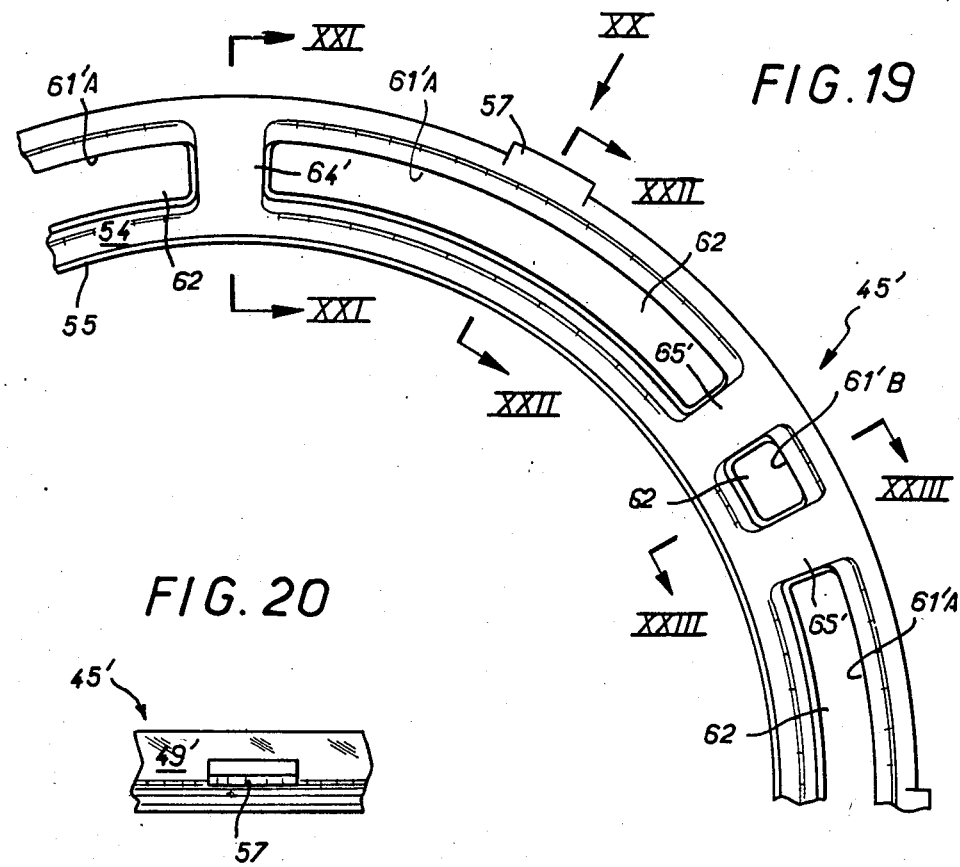
FIG.19
FIG.20
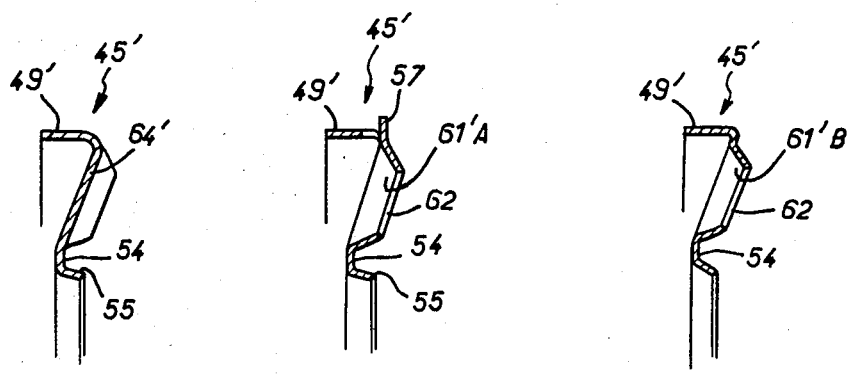
FIG.21  FIG.22  FIG.23

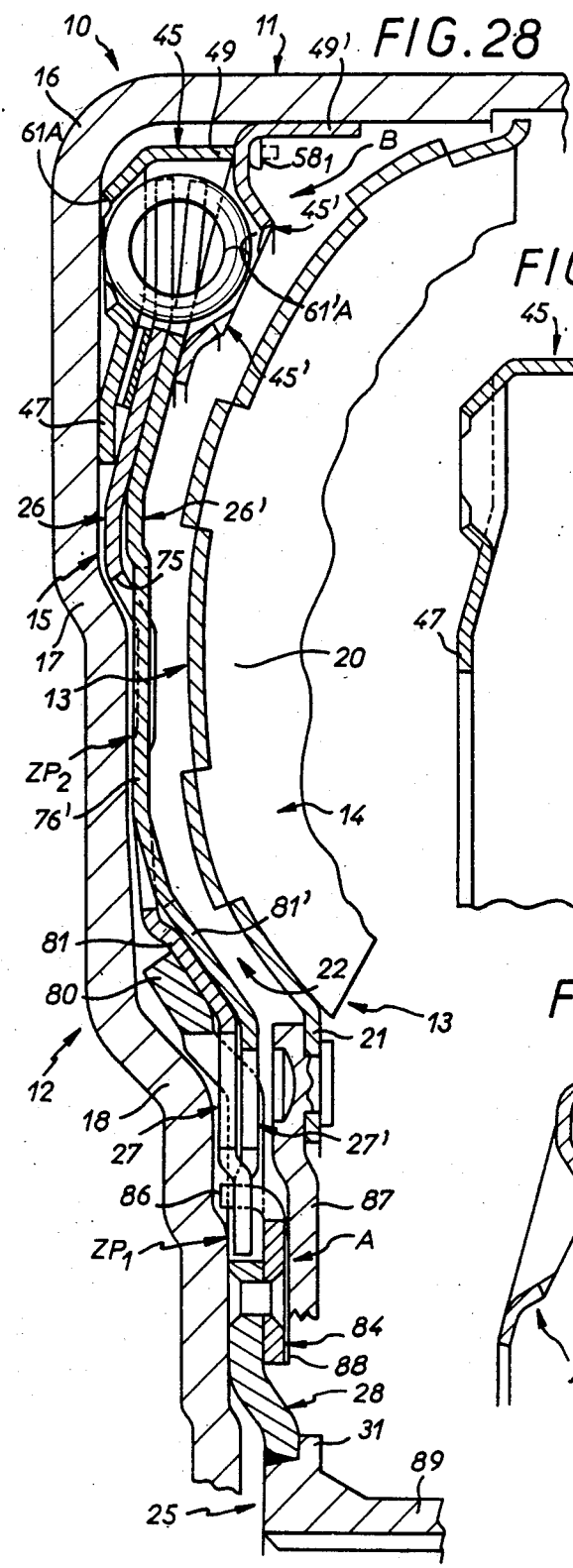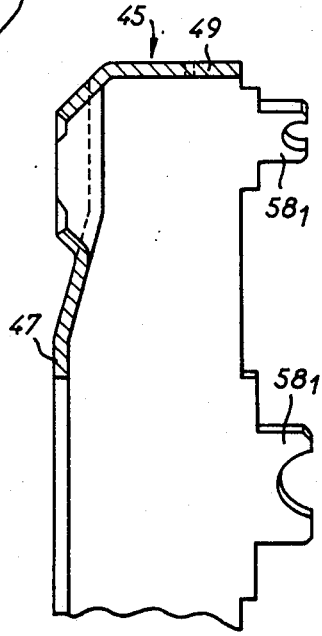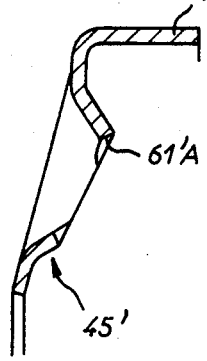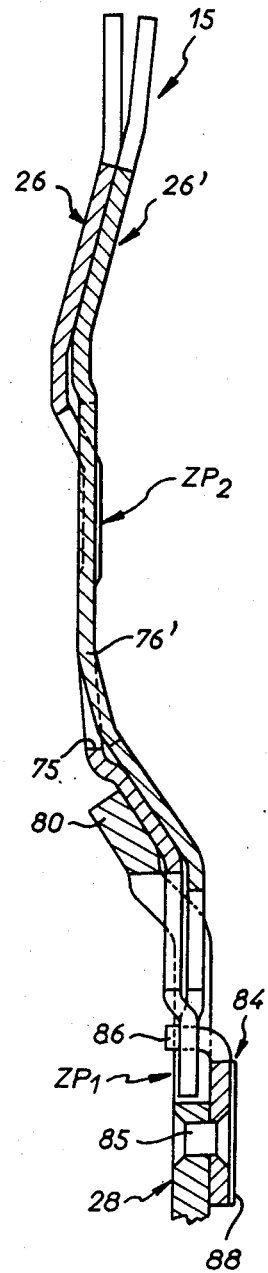

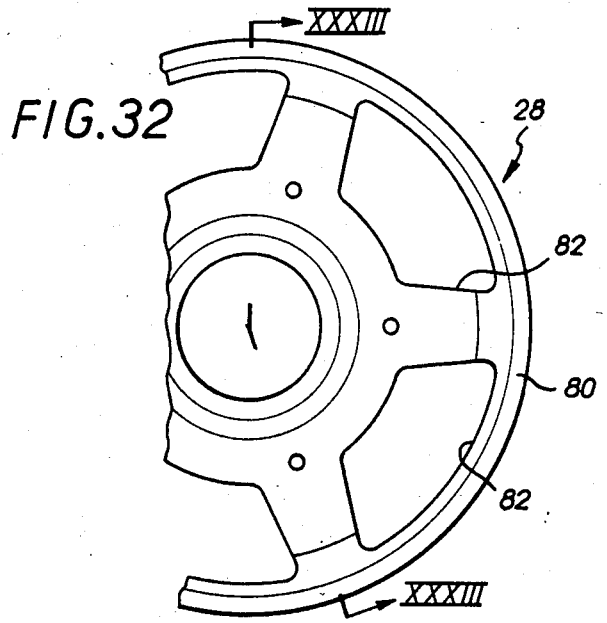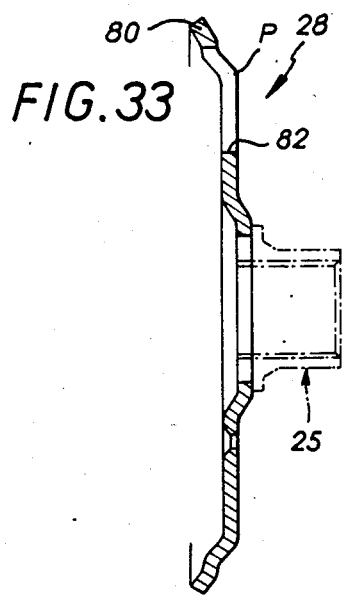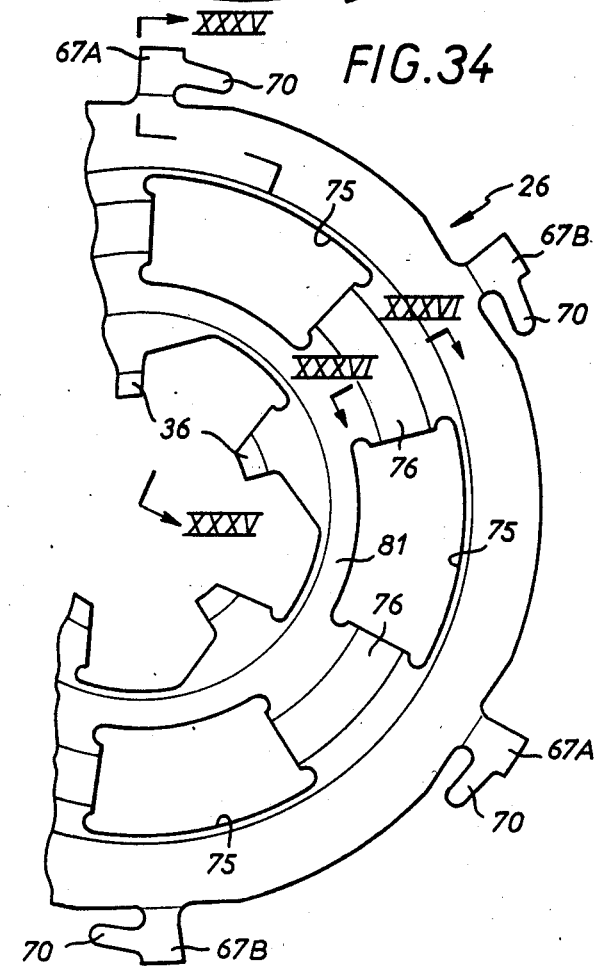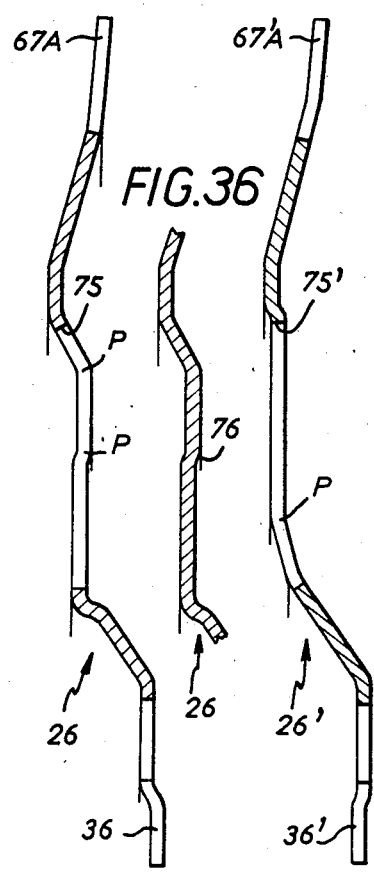

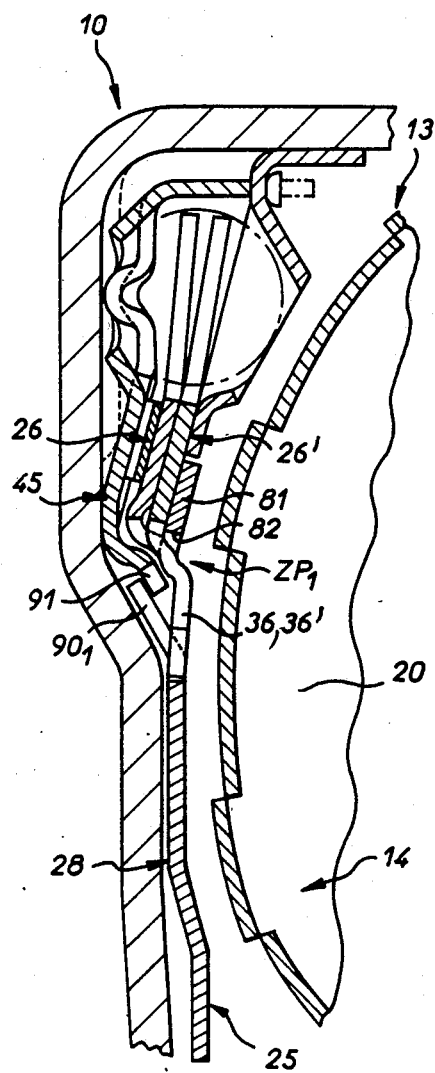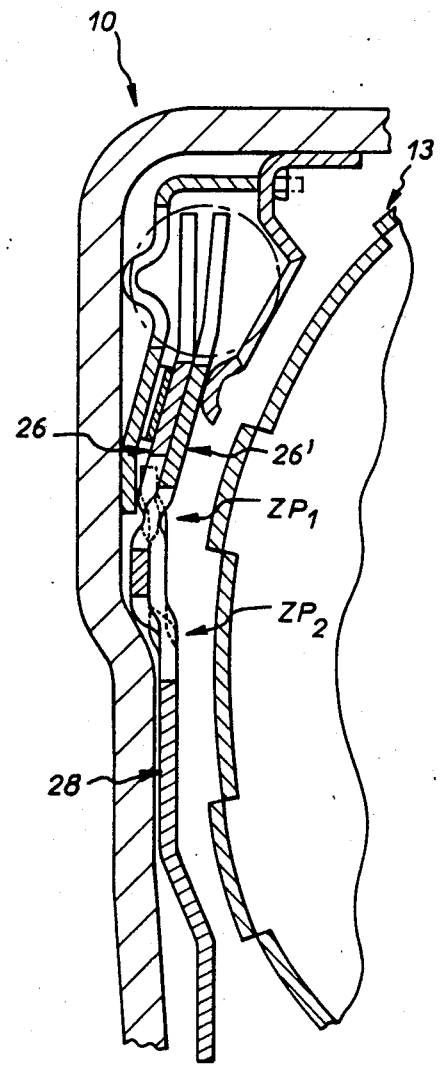

TORSIONAL DAMPING DEVICE HAVING WIDE RANGE CLEARANCE, AND A HYDRAULIC COUPLING HAVING SUCH A TORSIONAL DAMPING DEVICE, IN PARTICULAR FOR A MOTOR VEHICLE

The present invention is generally concerned with torsional damper devices of the kind comprising at least two coaxial parts disposed to rotate relative to one another within defined limits of relative angular displacement against elastic means, called circumferentially acting elastic means, adapted to be operative circumferentially between them for at least part of such relative angular displacement.

As is known, on an automotive vehicle a torsional damper device of this kind is usually inserted into the kinematic chain extending from the motor to the axles in order to smooth vibrations that may arise at any point in this kinematic chain and so to procure regulated transmission of rotational torque along the chain.

The present invention is more particularly directed to the case where, in order to obtain a relatively great range of relative angular displacements between the coaxial parts concerned for relatively low values of torque, a first of said parts comprises a hub and two flanges, referred to hereafter for convenience as the hub flange and hub counter-flange, each of which forms an annular member around said hub and each of which meshes with said hub through meshing means with clearance with, in the rest configuration of the assembly, an alternating arrangement whereby the meshing means with clearance between the hub and the hub flange are in circumferentially abutting relationship for one circumferential direction and, conjointly, the meshing means with clearance between said hub and the hub counter-flange are in circumferentially abutting relationship for the opposite circumferential direction, whereas a second part itself comprises at least one flange, usually called a guide ring, which also forms an annular member around the hub but which is free to rotate relative thereto, in either circumferential direction.

A torsional damper device of this kind is described in document No. EP-85401574.0.

Even more particularly, but not neccessarily exclusively, the present invention is directed to the case where a torsional damper device of this kind is intended to equip a hydraulic coupling or torque converter.

A hydraulic coupling device of this kind generally comprises an impeller wheel and a cover which itself comprises a generally cylindrical wall and a generally transverse wall and is fastened to the impeller wheel to form with the outside wall of the latter a casing in which are disposed, facing the impeller wheel, a turbine wheel, and in the inside volume of the cylindrical wall, between the transverse wall and said turbine wheel, a torsional damper device.

One problem to be overcome in implementing hydraulic coupling devices which incorporate in this way a built-in torsional damper device results in particular from the fact that the space available for installing the torsional damper device is particularly restricted, especially in the axial direction.

It is actually limited to the volume remaining available between the transverse wall of the cover and the turbine wheel.

Although this space widens at the periphery by virtue of the elbow bend forward between the transverse and cylindrical walls of the cover and the curvature of the turbine wheel blades at their periphery, the same does not apply in the axial direction in the vicinity of the root of these blades, and above all this is not the case in line with their median area, the swelling of said blades at this point significantly encroaching on this space.

Traditionally, and this is the case of the device which is the subject of the abovementioned document No. EP-85401574.0, the torsional damper devices are inscribed within a quadrilateral, having in the axial direction in line with their central part and in line with their median part dimensions comparable with that at the periphery, where in practice this dimension is conditioned by the presence of the circumferentially acting elastic means used.

The main reason for this is that the various flanges making up a torsional damper device of this kind are usually generally parallel to each other at all points.

Thus, in the abovementioned document No. EP-85401574.0, for example, the hub flange and the hub counter-flange each extend in their entirety in different transverse planes, so that their meshing means with clearance with the hub are also operative in different transverse planes, the axial distance between which is prejudicial to the overall axial dimension of the assembly in line with such meshing means.

It is of course possible to make do with this where there is no particular problem of congestion.

This is not the case, as emphasized above, when the torsional damper device must be fitted to a hydraulic coupling device.

A general object of the present invention is to obtain an arrangement by means of which this problem may be overcome in this case, and which also presents other advantages.

More precisely, a first object of the present invention is a torsional damper device, particularly for automotive vehicles, of the kind comprising at least two coaxial parts disposed to rotate relative to each other within defined limits of relative angular displacement against elastic means, called circumferentially acting elastic means, adapted to be operative circumferentially between them for at least part of such relative angular displacement, namely a first part comprising, on the one hand, a hub, and, on the other hand, two flanges, hereafter called for convenience the hub flange and hub counter-flange, each of which forms an annular part around said hub and each of which meshes with said hub through meshing means with clearance with, for the rest configuration of the assembly, an alternating arrangement whereby the meshing means with clearance between the hub and the hub flange are in circumferentially abutting relationship for one circumferential direction and, conjointly, the meshing means with clearance between said hub and the hub counter-flange are in circumferentially abutting relationship for the opposite circumferential direction, and a second part, itself comprising at least one flange, usually called the guide ring, which also forms an annular part around the hub but which is free to rotate relative thereto in either circumferential direction, this torsional damper device being generally characterised in that, between the inside and outside peripheries of the hub flange and the hub counter-flange, there is at least one area of said hub flange and of said hub counter-flange, hereafter referred to for convenience as the interpenetration area, where the hub flange and the hub counter-flange interpenetrate axially relative to each other; another object of the present invention is a hydraulic coupling device equipped with a torsional damper device of this kind.

For example, in a first embodiment, the areas in which the meshing means with clearance between the hub and the hub flange and between the hub and the hub counter-flange are operative form part of an interpenetration area of this kind, said operative areas being at least in substantial circumferential alignment with each other.

By action areas in substantial circumferential alignment with each other there is meant here action areas which, not withstanding their inherent axial extent and more or less convoluted configurations of the parts in question, are in substantially the same transverse plane.

In practice, the hub itself comprises a transverse flange, called hereafter for convenience the intermediate flange, constituting part of the meshing means with clearance, the action areas of said meshing means with clearance possibly each being at least partially confined within the thickness of said intermediate flange if required.

When, for example, in one specific embodiment the meshing means with clearance for the hub flange and the hub counter-flange and the intermediate flange comprise teeth, the teeth of one at least of the flanges that the hub flange and the hub counter-flange constitute are, for this purpose, that is to say in order to place them in the plane of the intermediate flange, at least partially offset axially in the direction towards the other relative to the main part of the flange concerned, and this applies to both of these flanges.

As an alternative to the preceding arrangement, or conjointly therewith, the hub flange and the hub counter-flange may comprise an interpenetration area radially spaced from their inside periphery.

For example, along this interpenetration area or intermediate interpenetration area, one at least of the flanges constituting the hub flange and the hub counter-flange comprises at least one opening, in the form of a window, for example, and the other comprises a portion hereafter referred to for convenience as the engagement portion, axially engaged within said opening.

Be this as it may, by virtue of the arrangement in accordance with the invention, the axial dimension needed to install the parts in question in line with the interpenetration area is advantageously minimised.

In practice, in the case of equipping a hydraulic coupling device, an interpentration area of this kind is preferably provided in line with the swelling of the turbine wheel, that is to say in line with the median area of the blades of the latter, where the space available is most restricted.

For example, in the case where the meshing means with clearance between the hub and the hub flange and those between the hub and the hub counter-flange utilize an intermediate flange, these meshing means with clearance may extend radially beyond the swelling of the turbine wheel relative to the axis of the assembly, in the vicinity of said swelling, and said intermediate flange is then the only thickness of material that has to be accommodated in line with the swelling.

As an alternative to this, the meshing means with clearance in question may extend between the axis of the assembly and the swelling of the turbine wheel and an interpenetration area with one or more openings and one or more engagement portions is then provided in line with said swelling.

In a case such as this the hub flange and the hub counter-flange are advantageously of relatively large size in the radial direction and, given the lever arm effect from which they thus benefit at the level of their teeth, they advantageously feature at this level a capacity for significant axial distortion, favoring their mechanical strength in service.

Thus in all cases there is advantageously, by virtue of the arrangement in accordance with the invention, perfect adaptation to the space available of the torsional damper device to be used, there being present in line with the swelling of the turbine wheel, where the space available is the most restricted, only one component part of the torsional damper device or component parts thereof which are interleaved axially with each other by means of an interpenetration area, whereas at the periphery, on either side of the swelling of the turbine wheel, where the space available widens, there may be easily accommodated the other necessary component parts, and more specifically at the larger diameter periphery of the assembly, the circumferentially acting elastic means to be employed.

Also, by virtue of the arrangement in accordance with the invention, that is to say by virtue of the presence of at least one interpenetration area between the hub flange and the hub counter-flange, and according to one specific characteristic of the invention, on relative angular displacement there occurs at the level of an interpenetration area of this kind circumferential driving of one of the flanges constituting the hub flange and the hub counter-flange by the other, the hub counter-flange being driven by the hub flange for one circumferential direction and the hub flange being driven by the hub counter-flange for the opposite circumferential direction.

For example, when the meshing means with clearance between the hub and the hub flange and those between the hub and the hub counter-flange form part of an interpenetration area of this kind, the circumferential driving of one of the flanges that the hub flange and the hub counter-flange constitute by the other is achieved by virtue of this interpenetration area, through the corresponding teeth of the flanges.

Subsequently, and in accordance with a complementary characteristic of the invention, if the teeth of the hub flange and the hub counter-flange have oblique flanks for contacting the teeth of the intermediate flange of the hub, complementing the flanks of the teeth of said intermediate flange, for their contact with each other, the teeth of the hub flange and the hub counter-flange then have straight radial flanks.

As an alternative to this, when an intermediate interpenetration area with one or more openings and one or more engagement portions engaged in such openings is provided between the flanges that the hub flange and the hub counter-flange constitute, the circumferential driving of one of these flanges by the other is advantageously achieved through the intermediary of this intermediate interpenetration area, which makes it possible to spare their teeth.

In all cases, all or part of the portions, such as teeth, edges of openings or engagement portions of these flanges and/or the intermediate flange of the hub, through which these parts are intended to come into circumferential bearing engagement with each other, are preferably, in configurations which may be highly diversified, more or less undulating in order to confer axial thickness of them and so, on the one hand, to improve the bearing area of their action area and so to spare them and, on the other hand, to minimise the risk that, in response to the loads to which they are subjected, notably under the effect of internal pressure, which leads to "axial bulging of the cover" and thus to axial displacement of such or such of the parts in question, they succeed in escaping from each other by slipping.

Thus, in practice, said portions feature at least one bend radially, that is to say in a radial plane in the assembly.

Finally, according to another characteristic of the invention, the circumferentially acting elastic means comprise two stages of elastic members of different stiffness with, for acting on the latter, arms provided for this purpose on the outside periphery of the hub flange and the hub counter-flange, so disposed that certain at least of the elastic members of a first of said stages are associated in pairs with, in the rest configuration of the assembly, axial superposition of the corresponding arms of said hub flange and said hub counter-flange between the two elastic members of a pair of this kind, whereas, for said rest configuration, certain at least of the elastic members of second of said stages are each individually surrounded, scissors-fashion, by two arms one of which belongs to the hub flange and the other to the hub counter-flange.

One advantage of an arrangement of this kind is easy adaptation to different operating conditions according to the specific applications to be satisfied.

These operating conditions may, for example, be made totally symmetrical for the two circumferential directions.

However, as an alternative to this, they may equally be made dissymmetrical, either by appropriately altering the stiffness of the elastic members in question, or by eliminating one or more of the arms from one of the flanges that the hub flange and the hub counter-flange constitute, which renders inactive for the circumferential direction in question, and for that direction only, the elastic member or members normally associated with this arm or these arms, or, further, by associating a number of such elastic members.

In all cases it is easy to achieve the required relatively great range of angular displacement for low values of torque, only the elastic members of a first stage chosen to be of relatively low stiffness being operative at this time.

Also, and conjointly, it is easy to achieve significant elastic abutment for high values of torque, the elastic members of a second stage, chosen to have a relatively high stiffness, then adding their effects to those of the previous ones.

The characteristics and advantages of the invention will moreover emerge from the following description given by way of example with reference to the accompanying schematic drawings in which:

FIG. 2 is a partial view of it to a larger scale in axial cross-section on the broken line II—II in FIG. 1;

FIGS. 2A, 2B are views reproducing part of that of FIG. 2 and artificially emphasizing particular components of the torsional damper device in accordance with the invention:

FIG. 15 is a partial view in elevation to the same scale as FIG. 4 of another of the component parts of the torsional damper device in accordance with the invention;

FIG. 16 is a partial view of it in plan, in the direction of the arrow XVI in FIG. 15;

FIGS. 17, 18 are partial views of it in axial cross-section on the lines XVII—XVII, XVIII—XVIII, respectively, in FIG. 15;

FIG. 19 is a partial view in elevation to the same scale as FIG. 4 of another of the component parts of the torsional damper device in accordance with the invention;

FIG. 20 is a partial view of it in elevation, in the direction of the arrow XX in FIG. 19;

FIGS. 21, 22, 23 are partial views of it in axial cross-section on the lines XXI—XXI, XXII—XXII, XXIII—XXIII, respectively, in FIG. 19;

FIG. 28 is a partial view in axial cross-section analogous to that of FIG. 2 for an embodiment of the torsional damper device in accordance with the invention;

FIG. 29 is a partial view in axial cross-section to the same scale as FIG. 28 of one of the component parts of the torsional damper device;

FIG. 30 is, in a similar manner, a view in partial axial cross-section of another of its component parts;

FIG. 31 is, also in a similar manner, a partial view in axial cross-section of a unitary sub-assembly that the torsional damper device comprises in this embodiment;

FIG. 32 is a partial view in elevation to a different scale of one of the component parts of this subassembly;

FIG. 33 is a view of it in axial cross-section on the broken line XXXIII—XXXIII in FIG. 32;

FIG. 34 is a partial view in elevation to the same scale as FIG. 32 of another of the component parts of the sub-assembly concerned;

FIGS. 35, 36 are partial views in axial cross-section of this component on the broken line XXXV—XXXV and the line XXXVI—XXXVI in FIG. 34;

FIG. 37 is, like FIG. 35, a view in partial axial cross-section of another of the component parts of the sub-assembly concerned;

FIGS. 47, 48 are also views in partial axial cross-section analogous to that of FIG. 2 and each concerning a respective other embodiment of the torsional damper device in accordance with the invention.

Figure 1:
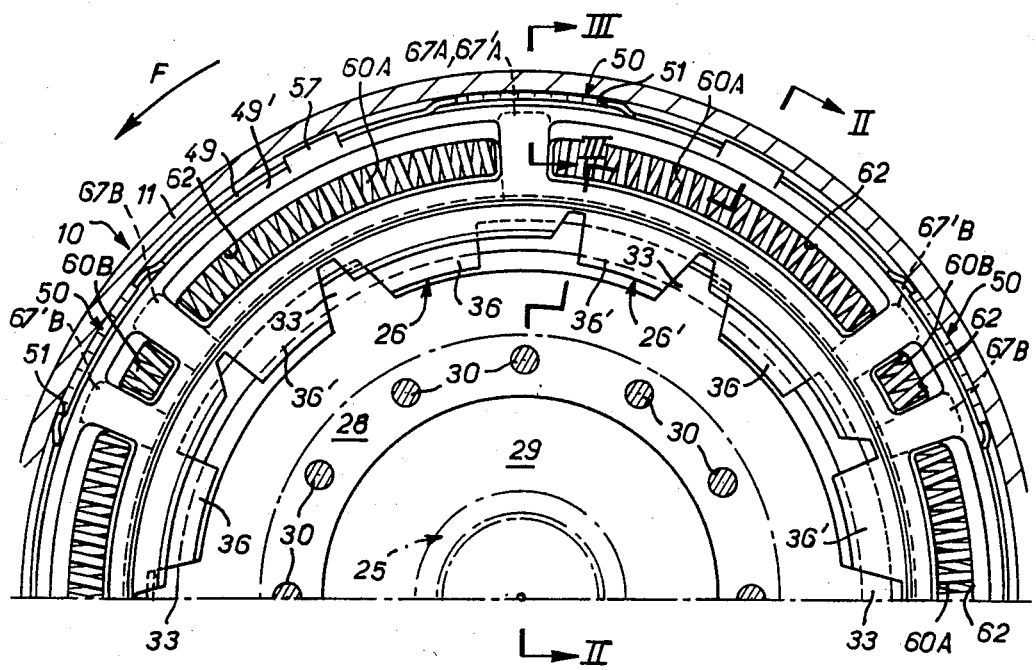
FIG. 1 is a partial view of a hydraulic coupling device equipped with a torsional damper device in accordance with the invention in partial transverse cross-section on the broken line I—I in FIG. 2.

These figures show by way of example the application of the invention to a hydraulic coupling with built-in torsional damper device.

As a hydraulic coupling of this kind does not of itself form part of the present invention it will not be described in complete detail here.

It will suffice to indicate that, within the internal volume of a cover 10 which is formed by a generally cylindrical wall 11 and a generally transverse wall 12 and which, through its generally cylindrical wall 11, is attached to the outside wall of an impeller wheel which is not visible in the figures, it comprises, on the one hand, facing the impeller wheel, a turbine wheel 13 with blades 14 and, between this turbine wheel 13 and its generally transverse wall 12, a torsional damper device 15.

By generally transverse wall is meant here, in the usual manner, a wall which, taken overall, extends substantially perpendicularly to the axis of the assembly, it being understood, however, that, as shown, it may have a more or less convoluted configuration.

In this instance the generally transverse wall 12 which forms a bend 16 with the generally cylindrical wall 11 with which it is associated features in succession from its periphery to the axis of the assembly two axial offsets 17, 18 towards the turbine wheel 13, the first substantially in line with the median area 20, or swelling, of the blades 14 of the latter, and the second substantially in line with its root 21.

As a result the volume 22 available between the turbine wheel 13 and the generally transverse wall 12 of the cover 10 is, in the axial direction, particularly restricted in line with the median area 20 of the blades 14 of the turbine wheel 13, is also restricted between said median area 20 of said blades 14 and the root 21 of said turbine area 13, and, on the other hand, widens relatively in the direction towards the generally cylindrical wall 11 of the cover 10, by virtue of the curvature of the peripheral area 23 of said blades 14.

In the embodiments shown, the torsional damper device 15 comprises, overall, two coaxial parts A, B disposed to rotate relative to each other within defined limits of relative angular displacement and against elastic means, called circumferentially acting elastic means, adapted to be operative circumferentially between them for at least part of the range of such relative angular displacement.

There is firstly a first part A which comprises, on the one hand, a hub 25 (FIG. 1) which, when the cover 10 is intended to be keyed to rotate with a first shaft, in practice a driving shaft, is intended to be keyed to rotate with a second shaft, in practice a driven shaft, and, on the other hand, two flanges 26, 26', hereafter called for convenience the hub flange and hub counter-flange, each of which forms an annular part around the hub 25, extending generally transversely relative to the axis of the assembly, and each of which meshes with said hub 25 through meshing means with clearance 27, 27' to be described in detail hereafter.

In the embodiments shown, the hub 25 itself comprises, generally transversely relative to the axis of the assembly, in order to constitute the meshing means with clearance 27, 27', a flange 28, called hereafter for convenience the intermediate flange.

Figure 3:
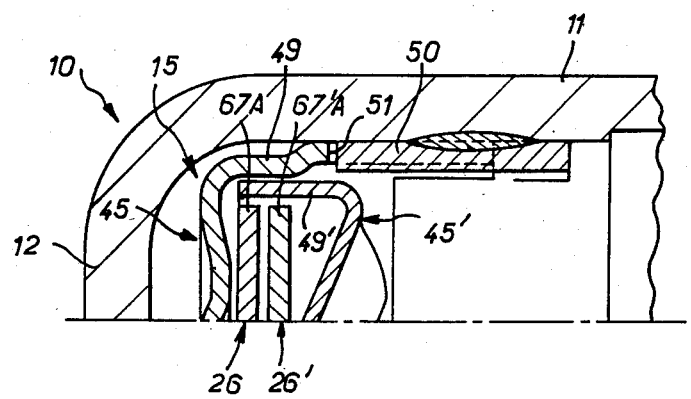
FIG. 3 is another view to the same scale as FIG. 2 of the hydraulic coupling device and the torsional damper device in accordance with the invention in partial axial cross-section on the line III—III in FIG. 1.
Figure 4:
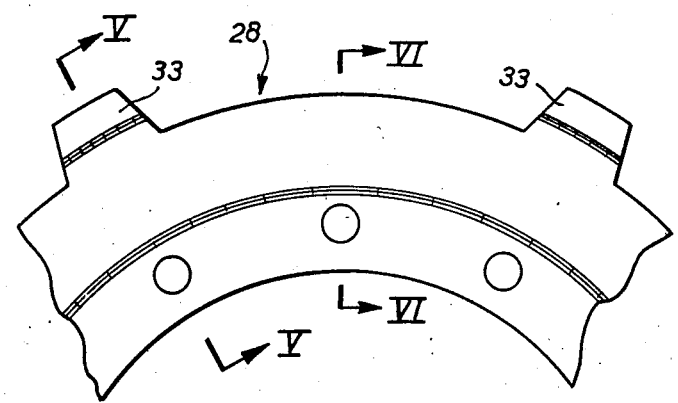
FIG. 4 is a partial view in elevation to a different scale of one of the component parts of the torsional damper device in accordance with the invention.
Figures 5, 6:
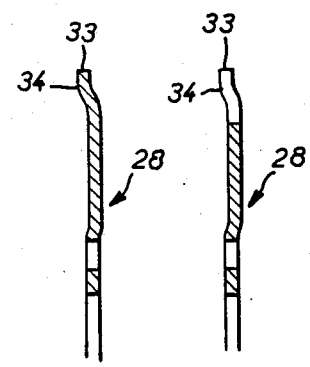
FIGS. 5, 6 are partial views in axial cross-section on the lines V—V and VI—VI, respectively, in FIG. 4.

More specifically, in the embodiment shown in FIGS. 1 through 24 the intermediate flange 28, which is shown in isolation in FIGS. 4 through 6, is attached to a flange 29 projecting radially from the outside periphery of the hub 25, being fastened to this flange 29 by rivets 30 in one piece therewith.

While, generally speaking, the intermediate flange 28 extends substantially plane between the offsets 17 and 18 in the transverse wall 12 of the cover 10, and thus in the most axially restricted area of the volume 22 available between the latter and the turbine wheel 13, the flange 29 itself has an offset 31, reflecting the offset 18 in the transverse wall 12 of the cover 10.

In the embodiment shown, the meshing means with clearance 27, 27' comprise, for the intermediate flange 28 of the hub 25, teeth 33 projecting radially from the outside periphery of the intermediate flange 28 for this purpose.

In practice, these teeth 33 are in one place with the intermediate flange 28 being formed with it by cutting an initially flat blank and are regularly distributed circumferentially, each having a generally trapezoidal profile, their lateral flanks being each oblique to the radial direction of the assembly passing through their median area.

In practice, also, to take account of the axial offset 17 in the transverse wall 12 of the cover 10, these teeth 33 each having their end offset axially in the direction towards this transverse wall 12 by an axial offset 34 in their median area.

The flanges that the hub flange 26 and hub counter-flange 26' constitute are shown in isolation, the former in FIGS. 11 through 14 and the latter in FIGS. 7 through 10.

Each comprises in their median area, generally perpendicular to the axis of the assembly, a plane annular part 35, 35' referred to hereafter for convenience as the main part, in which part they are parallel to each other, being in practice in contact with each other.

In the embodiment shown in FIGS. 1 through 24, the meshing means with clearance 27, 27' comprise, both for the hub flange 26 and for the hub counter-flange 26', teeth 36, 36' intended to act with the teeth 33 of the intermediate flange 28 of the hub 25.

There is limited radial clearance between them which provides for recentering of the hub flange 26 and the hub counter-flange 26' on the intermediate flange 28 in operation.

In practice, for implementing the meshing means with clearance 27, 27' the hub flange 26 and the hub counter-flange 26' have the same number of teeth 36, 36' as the teeth 33 of the intermediate flange 28 of the hub 25.

Figure 25:
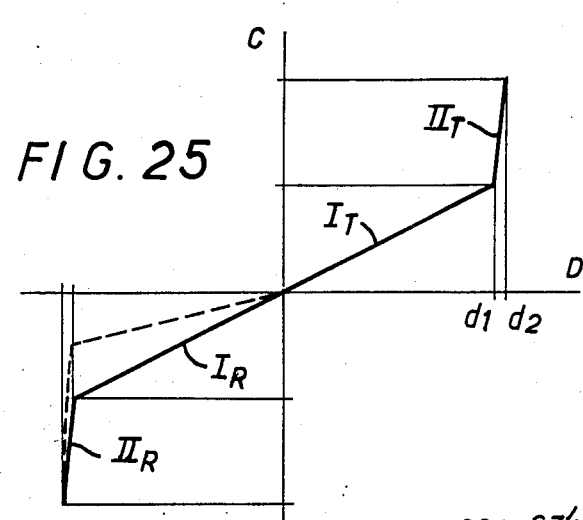
FIG. 25 is a diagram illustrating such operation.

In the manner known in itself, there is, in the rest configuration of the assembly, an alternating arrangement of the meshing means with clearance 27, 27' concerned, whereby the meshing means with clearance 27 between the intermediate flange 28 of the hub 25 and the hub flange 26 are in circumferentially abutting relationship for one circumferential direction, which, for example and as shown schematically by the arrow F in FIGS. 1 and 25, is the normal direction of rotation of the assembly and so corresponds to "upshift" operation of said assembly for which the motor torque predominates over the resisting torque and, conjointly, the meshing means with clearance 27' between said intermediate flange 28 and the hub counter-flange 26' are in circumferentially abutting relationship for the opposite circumferential direction, which thus corresponds to "downshift" operation of said assembly, for which the resisting torque predominates over the motor torque.

In accordance with the invention, between the inside and outside peripheries of the hub flange 26 and the hub counter-flange 26' there is at least one area of said hub flange 26 and said hub counter-flange 26', hereafter called for convenience the interpenetration area, where the hub flange 26 and the hub counter-flange 26' interpenetrate axially with respect to each other.

In the embodiment shown in FIGS. 1 through 24, the action areas Z, Z' in which the meshing means with clearance 27 are operative between the hub 25, more precisely the intermediate flange 28 of the hub 25, on the one hand, and the hub flange 36, on the other hand and those 27' between the intermediate flange 28, on the one hand and the hub counter-flange 26', on the other hand, form part of an interpenetration area of this kind designated ZP1 in these figures, said action areas Z, Z' being at least in part in substantial circumferential alignment with each other.

In order to highlight them the action areas Z, Z' are schematically represented by shading in FIGS. 2A, 2B.

To improve the clarity of FIGS. 2A, 2B the contour of the tooth 33 of the intermediate flange 28 which is shown has been accentuated, whereas the contours of the corresponding teeth 36, 36' of the hub flange 26 and the hub counter-flange 26' are alternately shown in thinner line and in chain-dotted line.

In the embodiment shown in FIGS. 1 through 24, the action areas Z, Z' are in practice both confined within the thickness of the intermediate flange 28, being assumed to affect the median area of the lateral flanks of the teeth 33 of the latter.

For this to be so the teeth of at least one of the flanges that the hub flange 26 and the hub counter-flange 26' constitute are at least partially offset axially towards the other of these flanges relative to the corresponding main part 35, 35'.

In the embodiment shown, this applies to the hub flange 26 and to the hub counter-flange 26'.

In practice, the teeth 36 of the hub flange 26 which, of the flanges that the hub flange 26 and the hub counter-flange 26' constitute, is that axially farther away from the turbine wheel 13, have their end 40 axially offset towards the turbine wheel 13.

Conjointly, the teeth 36' of the hub counter-flange 26' which, of the flanges in question is that axially nearer the turbine wheel 13, have their median part 30' offset in the direction away from the turbine wheel 30, their median part having a half-wave undulation for this purpose.

As previously indicated, an for both the hub flange 26 and the hub counter-flange 26', the axial offsets mentioned above are in this instance relative to the corresponding main part 35, 35'.

As will be noted, and ignoring the inherent axial offset of the end of the teeth 33 of the intermediate flange 28, the action areas Z, Z' of the latter of the teeth 36, 36' of the hub flange 26 and the the hub counter-flange 26' extend generally in a common transverse plane of the assembly, which is the plane of the intermediate flange, assuming that this were reduced to a single plane.

In practice, the teeth 36 of the hub flange 26 alterate circumferentially with those 36' of the hub counter-flange 26'.

For the rest configuration of the assembly (FIGS. 1 and 24A) each tooth 33 of the auxiliary flange 28 of the hub 25 is bracketed without clearance and thus in circumferentially abutting engagement, on the one hand, on a first circumferential side corresponding to the circumferential direction shown by the arrow F, by a tooth 36 of the hub flange 26 and, on the opposite circumferential side, by a tooth 36' of the hub counter-flange 26'.

Because of this, the lateral flank of the teeth 36, 36' through which these are adapted to act with the teeth 33 of the intermediate flange 28 is oblique, like the lateral flanks of these teeth 33.

On the other hand, and for reasons which will emerge later, the other of the flanks of the teeth 36, 36' of the hub flange 26 and the hub counter-flange 26' is straight, extending along a radius of the assembly.

In practice, the teeth 36, 36' extend generally radially in projection from the inside periphery of the main part 35, 35' of the hub flange 26 and the hub counter-flange 26', being formed in one piece with these, by cutting out initially flat blanks, like the intermediate flange 28 of the hub 25.

In the embodiment shown, and for reasons which will emerge hereinafter, the hub counter-flange 26' also features, projecting from its inside periphery and alternating with its teeth 36', lugs 42 of less radial extent than said teeth 36' and, like them, but in the opposite axial direction, offset axially relative to the corresponding main part 35'.

In practice, by means of an axial offset, these lugs 42 have their end 43 offset axially towards the turbine wheel 13.

The part B of the torsional damper device 15 itself comprises at least one flange, usually called a guide ring, which also forms an annular part around the hub 25 but which is free to rotate relative to the latter, in either circumferential direction.

In practice this part B comprises two such guide rings 45, 45' disposed on respective sides of the assembly consisting of the hub flange 26 and the hub counter-flange 26', being constrained to rotate together.

The guide ring 45, which is that axially nearer the transverse wall 12 of the cover 10, is shown in isolation in FIGS. 15 through 18 and the guide ring 45', which is that axially nearer the turbine wheel 13, is shown in isolation in FIGS. 19 through 23.

By means of a median area 46 which is axially in line with the main part 35, 35' of the hub flange 26 and the hub counter-flange 26', the guide ring 45' is in axial bearing engagement against the transverse wall 12 of the cover 10.

Its inside periphery 47, which is axially in line with the meshing means 27, 27', is offset axially towards the turbine wheel 13.

It thus defines in conjunction with the lugs 42 of the hub flange 26' a volume within which are axially confined the previously described meshing means 27, 27'.

Because of this the teeth 33 of the intermediate flange 28 of the hub 25 forming part of these meshing means 27, 27' are prevented from escaping axially from the corresponding teeth 36, 36' of the hub flange 26 and the hub counter-flange 26'.

In the embodiment shown, the inside periphery 47 of the guide ring 45 features along its edge, in order to stiffen it, a fold 48 which extends obliquely away from the associated guide ring 45' and thus extends in the direction towards the transverse wall 12 of the cover 10.

At its outside periphery the guide ring 45 features an axial extension 49 through which, in the embodiment shown in FIGS. 1 through 24, it is constrained to rotate with the cylindrical wall 11 of the cover 10 and which, in this embodiment, constitutes a circumferentially continuous ferrule.

This axial extension 49 extends away from the transverse wall 12 of the cover 10.

In the embodiment shown and, by virtue of provisions which do not constitute part of the present invention and so will not described in more detail here, the guide ring 45 is constrained to rotate with the cylindrical wall 11 of the cover 10 by "dogs" 50, that is to say wedges which, being wedge-shaped, are each individually engaged, in the direction towards the transverse wall 12 of the cover 10, in notches 51 provided for this purpose in complementary manner in the axial extension 49 of the guide ring 45.

In practice, in the embodiment shown, the poritions of an axial extension 49 of this kind in which are individually formed the notches 51 are offset radially away from the axis of the assembly relative to the main part of this axial extension 49, so that, being in contact with the cylindrical wall 11 of the cover 10, they advantageously center the torsional damper device 15 within the cover 10.

Also, in the embodiment shown, the lateral edges of each notch 51 are axially extended by lugs 52.

Be this as it may, and as can be seen in FIG. 3, each dog 50 used is for example attached by welding, and in practice by spot welding, to the inside surface of the cylindrical wall 11 of the cover 10.

The inside periphery 54 of the guide ring 45' extends axially substantially in line with the median area 46 of the guide ring 45 and thus in line with the main part 35, 35' of the hub flange 36 and the hub counter-flange 26.

It is substantially plane and it is in contact with the main part 35' of the hub counter-flange 26'.

Along its edge it comprises, to stiffen it, a fold 55 which extends obliquely, as shown, or at right angles, away from the associated guide ring 45 and thus extends towards the turbine wheel 13.

To take account of the inherent configuration of the volume available, the guide ring 45' extends generally obliquely relative to the axis of the assembly from its inside periphery 54, following the curvature of the blades 14 of the turbine wheel 13.

As a corollary to this, the corresponding part of the guide ring 35 also extends initially obliquely from its median area 46, before becoming straight again at the point where it merges with the axial extension 49 that follows on from it.

At its outside periphery the guide ring 45' also comprises in the embodiment shown an axial extension 49'.

However, in the embodiment shown in FIGS. 1 through 24, this is nested within axial extension 49 of the guide ring 45, without necessarily being in contact with it, and therefore extends towards the transverse wall 12 of the cover 10.

In the embodiment shown the guide ring 45' is constrained to rotate with the guide ring 45 by a mortise and tenon arrangement.

In practice, in this embodiment, the guide ring 45' has on its outside periphery spaced radial tenons 57 which, formed for example by hollows in its axial extension 49', are each individually engaged with complementary mortises 58 provided for this purpose and in corresponding relationship on the edge of the radial extension 49 of said guide ring 45, alternating with the notches 51 of the latter.

The assembly is retained axially by crimping at least part of the edges of these mortises 58 over the corresponding tenons 57.

In the embodiment shown, the circumferentially acting elastic means provided between the resulting part A and B of the torsional damper device 15 comprise two stages of elastic members of different stiffness.

In practice these are helical coil springs.

Thus there are in a first stage springs 60A of relatively low stiffness and in a second stage springs 60B of relatively high stiffness, in practice of significantly higher stiffness than the foregoing springs 60A.

In the embodiment shown the springs 60A, 60B are all disposed on a common circumference of the assembly and, in order to retain them in position, each is individually disposed partly in housings 61A, 61B provided for them in the guide ring 45, more precisely in the axially distorted part of the guide ring 45 extending between its median part 46 and its outside periphery, and partly in housings 61'A and 61'B also provided for them in the guide ring 45', more precisely in the oblique part of the latter.

In the case of the guide ring 45, the housings 61A, 61B are simple windows.

In the case of the guide ring 45', the housings 61'A, 61'B are stamped areas each of which is also individually open to the outside, through a window 62 in its median area.

The relatively low stiffness springs 60A each have a relatively great circumferential extent and certain at least of them are associated in pairs, the two springs 60A of the same pair extending circumferentially one after the other.

In the embodiment shown this applies to all the relatively low stiffness springs 60A.

The corresponding housings 61A, 61'A in the guide rings 45, 45' are thus separated from each other only by a bar 64, 64' of relatively moderate axial extent.

As a corollary to this, the relatively high stiffness springs 60B each have a relatively moderate circumferential extent and each is individually disposed circumferentially between two pairs of relatively low stiffness springs 60A.

The corresponding housings 61B, 61'B in the guide rings 45, 45' are separated from the surrounding housings 61A, 61'A by bars 65, 65' which have a circumferential extent comparable with that of the foregoing bars 64.

In practice, this circumferential extent is also comparable with that of the relatively high stiffness springs 60B concerned.

As shown, the notches 51 in the axial extension 49 of the guide ring 45 for the dogs 50 are preferably disposed in an alternating arrangement and radially in line with the bars 64 of the guide ring 45, and also radially in line with the housings 61B that the latter comprises.

As a corollary to this, the mortises 58 that the guide ring 45 comprises for the tenons 57 of the guide ring 45' are disposed radially in line with the median area of the housings 61A that the guide ring 45 also comprises.

For both the guide rings 45, 45' the housings 61A, 61B, 61'A, 61'B for the springs 60A, 60B are of the same circumferential length and, in the rest configuration of the assembly, the springs 60A, 60B are disposed without clearance, and preferably with slight prestressing, in their respective housings 61A, 61B, 61'A, 61'B.

Where they act on these springs 60A, 60B the flanges that the hub flange 26 and the hub counter-flange 26' of the part A of the torsional damper device 15 in accordance with the invention constitute comprises arms 67A, 67B, 67'A, 67'B projecting radially from their outside periphery.

Like the teeth 36, 36' these arms 67A, 67B, 67'A, 67'B are in one piece with the flanges that they equip, being formed with them from initially flat blanks.

In the rest configuration of the assembly the arms 67A, 67'A which are designed to act only with the relatively low stiffness spring 60A are superposed axially on each other between the guide rings 45 and 45', being also superposed axially to the bars 64, 64' of these guide rings 45, 45' between the corresponding relatively low stiffness springs 60A.

In practice the arms extend obliquely away from the main part 35, 35' of the hub flange 26 and the hub counter-flange 26' parallel to the corresponding oblique parts of the guide rings 45, 45' and each has in its median area a bend 66 beyond which each then extends perpendicularly to the axis of the assembly.

The arms 67B, 67'B are designed to act on a relatively low stiffness spring 60A for a first circumferential direction or on a relatively high stiffness spring 60B for the opposite circumferential direction.

In practice these arms extend generally obliquely from the main part 35, 35' of the hub flange 26 and the hub counter-flange 26' parallel to the corresponding oblique parts of the guide rings 45, 45'.

In the rest configuration of the assembly the relatively high stiffness springs 60B are thus each individually bracketed, scissors-fashion, by arms 67B, 67'B one forming part of the hub flange 26 and the other part of the hub counter-flange 26'.

In practice, in the rest configuration of the assembly each of the arms 67B, 67'B is axially superposed to the corresponding bars 65, 65' of the hub flange 26 and the hub counter-flange 26'.

The torsional damper device 15 thus obtained is completed by axially acting elastic means adapted to urge together the hub flange 26 and the hub counter-flange 26' and to urge the combination of these towards a guide ring 45, 45' for elastic calibration of the friction developed between these various members when they are displaced angularly relative to each other.

In the embodiment shown these axially acting elastic means consist of a plurality of leaf springs 68 disposed substantially tangentially to a common circumference of the assembly and bearing on the guide ring 45, being keyed to the latter circumferentially, substantially in line with the main part 35, 35' of the hub flange 26 and the hub counter-flange 26' by which the flanges that the hub flange 26 and the hub counter-flange 26' constitute are in contact with each other.

As will be noted, the fold 55 in the guide ring 45' that stiffens it is substantially axially aligned with the leaf springs 68 constituting the axially acting elastic means employed.

Figure 24A:
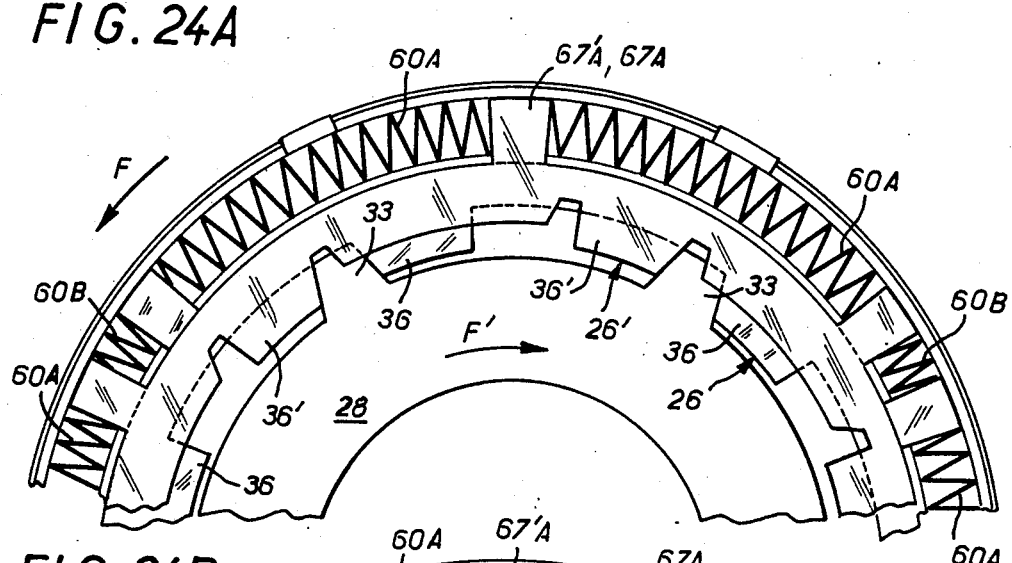
FIGS. 24A, 24B, 24C are views which, corresponding to that of FIG. 1, relate to various phases of the operation of the torsional damper device in accordance with the invention.

As mentioned above, each tooth 3 of the intermediate flange 28 of the hub 25 is bracketed on the one hand by the tooth 36 of the hub flange 26 and on the other hand by a tooth 36' of the hub counter-flange 26' in the rest configuration of the assembly (FIG. 24A).

When in operation a rotational torque is applied to the cover 10 thus to the part B of the torsional damper device 15, it is normally the latter through the intermediary of the springs 60A, 60B that tends to drive in the same direction, being that shown by the arrow F in FIG. 24A, the part A of the torsion damper device 15.

To simplify the explanation, it will however be assumed hereinafter that, to the contrary, it is then the part A which, in the direction shown by the arrow F' in FIG. 24A, opposite that shown by the arrow F and assumed to correspond to "upshift" operation of the assembly, tends to drive the part B.

Initially (FIG. 24B) only the hub flange 26 of the part A is operative, in response to the action of the intermediate flange 28 of the hub 25.

Thus only the relatively low stiffness springs 60A on which the arms 67A, 67B of the hub flange 26 act initially yield elastically although, in spite of the driving force to which it is subject through friction, the hub counter-flange 26' remains in its initial position by virtue of the bearing engagement between its arms 67'B and the relatively high stiffness springs 60B.

In the diagram of FIG. 25 there is plotted along the horizontal axis of the relative angular displacement D between the parts A and B of the torsional damper device 15 and along the vertical axis the torque C passing from one of these parts to the other; the curve representing this first phase of operation is a straight line $I_T$ the relatively gentle slope of which reflects the stiffness of the relatively low stiffness springs 60A which are alone operative at this time.

This first phase of operation continues until, for a value d1 of the relative angular displacement D, the teeth 36 of the hub flange 26 come into contact through their straight flank with the corresponding straight flank of the teeth 36' of the hub counter-flange 26'.

Figure 24B:
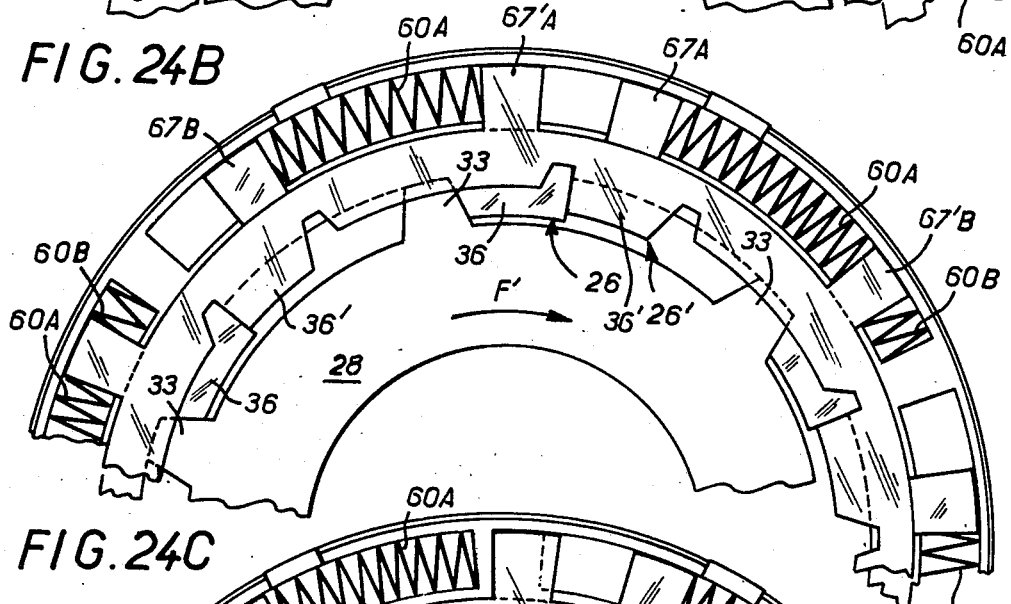

Then, in response to the action of the intermediate flange 28 of the hub 25, which continues to act in the direction of the arrow F' in FIG. 24B, the counter-flange 26' is driven in its turn through the intermediary of the hub flange 26.

Thus in accordance with the invention on relative angular displacement of the assembly the counter-flange 26' is driven circumferentially by the hub flange 26 in the circumferential direction in question.

In response to the action of the arms 67'B of the hub counter-flange 26', the relatively high stiffness springs 60B then in turn begin to act, adding their effects to those of the relatively low stiffness springs 60A which continue to be compressed.

In the diagram of FIG. 25, the curve representing this second phase of operation is a straight line $II_T$ the slope of which, significantly greater than that of the preceding straight line $I_T$, reflects the combined stiffness of the relatively high stiffness springs 60B and the relatively low stiffness springs 60A.

Figure 24C:
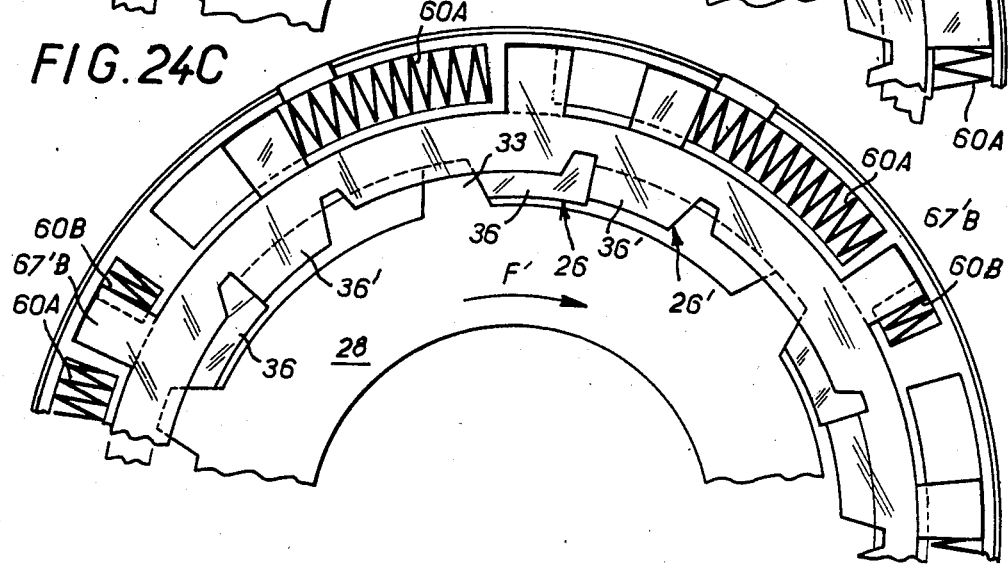

This second phase of operation continues until, for a value d2 of the relative angular displacement D, there occurs, for example, either circumferential elastic bearing engagement of the part A on the springs 60A, 60B, or positive bearing engagement of the part A on the part B (FIG. 24C).

This positive bearing engagement may be obtained either by the turns of any one at least of the springs, in practice a relatively high stiffness spring 60B, becoming contiguous, or by providing for an abutting relationship (not shown here) between the parts A and B concerned.

When the torque between the parts A and B is reversed, in "downshift" operation of the assembly, there is initially a relatively fast and in fact virtually instantaneous expansion of the springs 60B, 60A, with the assembly returning to the initial rest position, and then in succession and by virtue of a process analogous to that previously described, and therefore along the straight lines $I_R$, $II_R$ analogous to the previous ones, recompression in the opposite circumferential direction firstly of the relatively low stiffness springs 60A then the relatively high stiffness springs 60B.

However, it is then the hub counter-flange 26' which becomes operative first, in response to the action of the intermediate flange 28 of the hub 25, before, through its intermediary, the hub flange 26 is also driven circumferentially in the corresponding circumferential direction.

It will be understood that in the foregoing description and in order to simplify the explanation no account has been taken of the hysteresis phenomenon due to friction occurring on relative angular displacement between the various component parts of the torsional damper device 15 concerned.

In the embodiment shown, this friction is primarily due to the contact provided for this purpose between the various flanges.

It goes without saying that, if desired, friction rings may be disposed between these flanges, so as to set the corresponding friction forces to a required value.

Be this as it may, and as is known, the resulting hysteresis phenomenon results in a difference for the same value of relative angular displacement D between the values of the torque when this is increasing and the value when it is decreasing.

There are preferably associated with the springs 60A, 60B, more precisely with the relatively low stiffness springs 60A which are more sensitive because of their greater circumferential extent and lower stiffness, retaining means adapted to hold them in position radially against centrifugal force.

Figure 7:
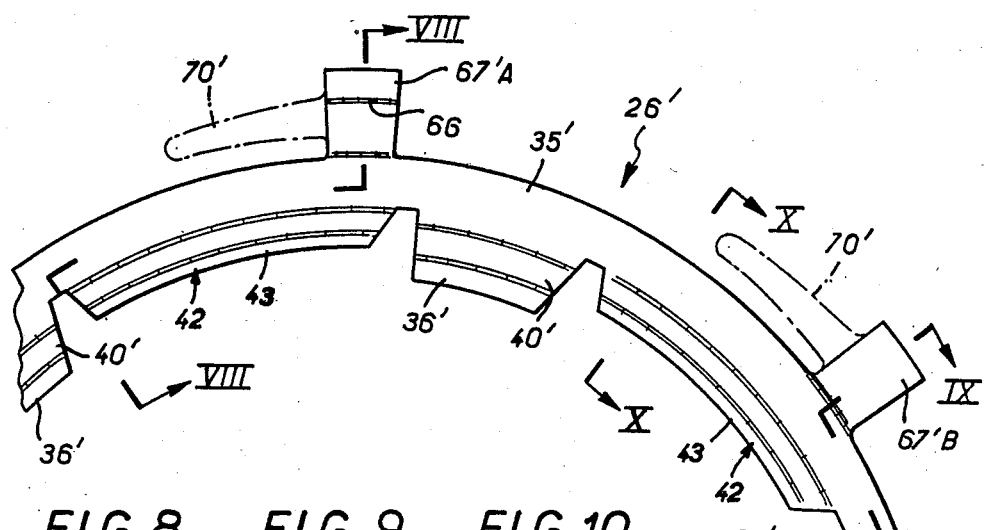
FIG. 7 is a partial view in elevation to the same scale as FIG. 4 of another of the component parts of the torsional damper device in accordance with the invention.
Figures 8, 9, 10:
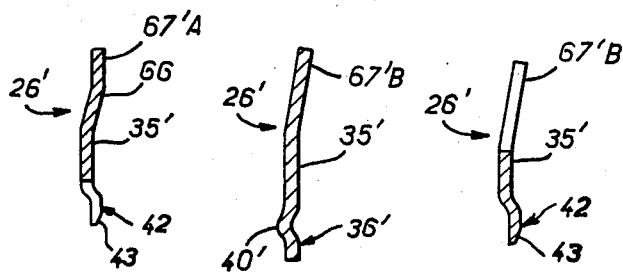
FIGS. 8, 9, 10 are partial views of it in axial cross-section on the lines VIII—VIII, IX—IX and X—X of FIG. 7.
Figure 11:
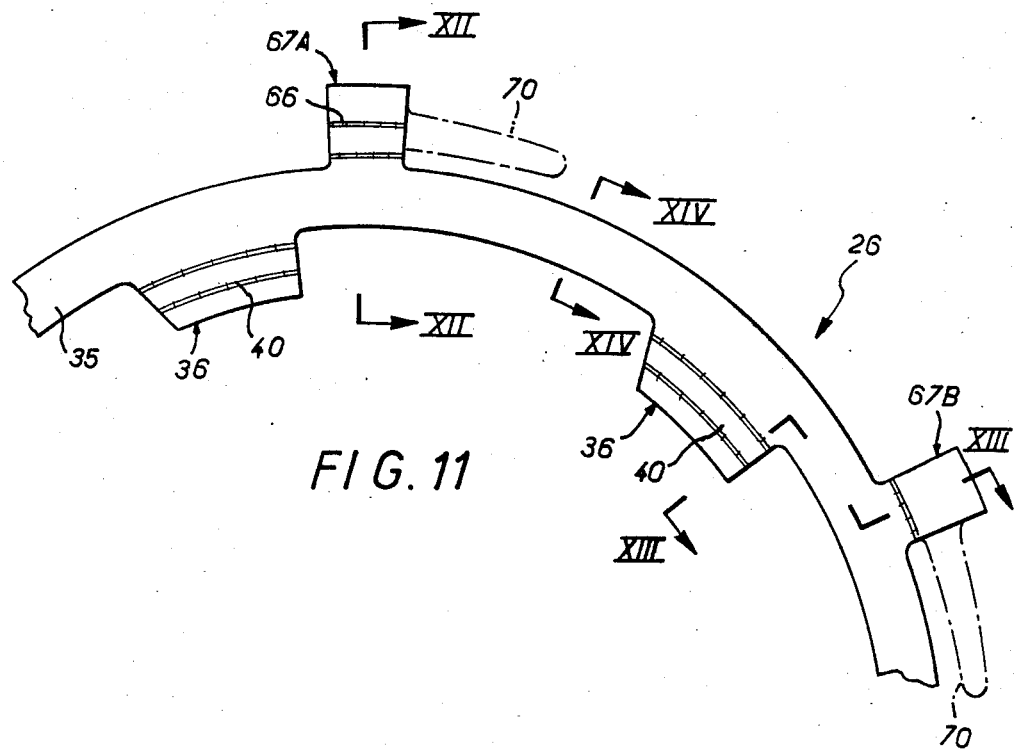
FIG. 11 is a partial view in elevation to the same scale as FIG. 4 of another of the component parts of the torsional damper device in accordance with the invention.
Figure 12:
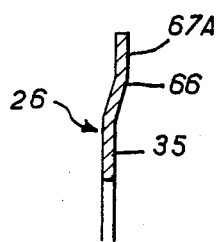
FIGS. 12, 13, 14 are partial views of it in axial cross-section on the lines XII—XII, XIII—XIII, XIV—XIV, respectively, in FIG. 11.
Figure 13:
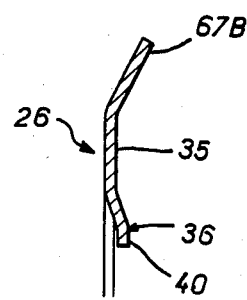
Figure 14:
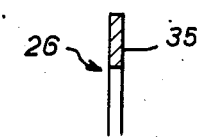
Figure 26:
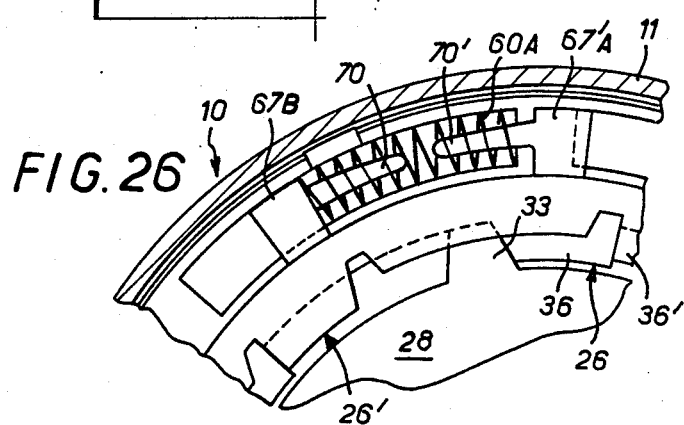
FIG. 26 is a view in transverse cross-section repeating part of FIG. 1 and relating to an embodiment.

For example, and as schematically represented in chain-dotted line in FIGS. 11 and 7 and in unbroken line in FIG. 26, these retaining means may comprise fingers 70, 70' which project circumferentially on the arms 67A, 67B, 67'A, 67'B of the hub flange 26 and the hub counter-flange 26', in one circumferential direction in the case of the hub flange 26 and in the opposite circumferential direction in the case of the hub counter-flange 26', and over which are circumferentially engaged the relatively low stiffness springs 60A.

As shown, these fingers 70, 70' are preferably tapered towards their free end so as to facilitate the successive engagement over them of the various turns of the relative low stiffness springs 60A during their compression, with their radially innermost edge coaxial with the axis of the assembly.

Figure 27:
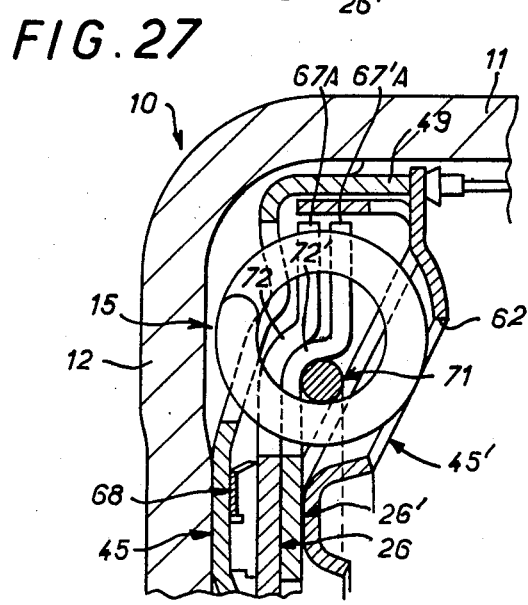
FIG. 27 is a view in axial cross-section repeating part of that of FIG. 2 and relating to another embodiment.

In the embodiment shown in FIG. 27, the retaining means employed comprise a ring 71 over which are engaged both the relatively low stiffness springs 60A and the relatively high stiffness springs 60B and which is itself keyed radially to certain at least of the arms 67A, 67B, 67'A, 67'B of the hub flange 26 and the hub counter-flange 26'.

As shown, for keying this ring radially the arms concerned of the hub flange 26 and the hub counter-flange 26' comprise a bend 72, 72', for example.

In the foregoing description, the meshing means with clearance 27 between the hub 25, more precisely the intermediate flange 28 of the latter, on the one hand, and the hub flange 26, on the other hand, and those 27' between this intermediate flange 28 and the hub counter-flange 26' extend radially slightly beyond the median area 20, or swelling, of the blades 14 of the turbine wheel 30 relative to the axis of the assembly, in the vicinity of said swelling.

Thus only the intermediate flange 28 extends in line with the swelling.

As an alternative to this, in the embodiment shown in FIGS. 28 through 41, the meshing means with clearance 27, 27' extend between the axis of the assembly and the swelling of the turbine wheel 13.

However, radially spaced from their inside periphery, the hub flange 26 and the hub counter-flange 26' then comprise an interpenetration area ZP2, or intermediate interpenetration area, and this intermediate interpenetration area ZP2 is disposed precisely in line with the median area 20, or swelling, of the blades 14 of the turbine wheel 13.

Overall, along the length of the intermediate interpenetration area ZP2, at least one of the flanges that the hub flange 26 and the hub counter-flange 26' constitute comprises at least one opening 75, 75', in the form of a window for example and as shown, and the other comprises a portion 76, 76' hereafter referred to for convenience as the engagement portion, engaged axially into an opening 75, 75' of this kind.

This engagement portion 76, 76' has in practice and for reasons that will emerge hereinafter a smaller circumferential extent than the opening 75, 75' in which it is engaged.

As shown, one at least of these flanges, and in practice each of them, preferably comprises circumferentially alternating engagement portions 76, 76' and openings 75, 75' and their arrangement is the same for both of them.

This is the reason for which, in the figures, only the hub flange 26 is shown in elevation and in isolation (FIG. 34).

Figure 38:
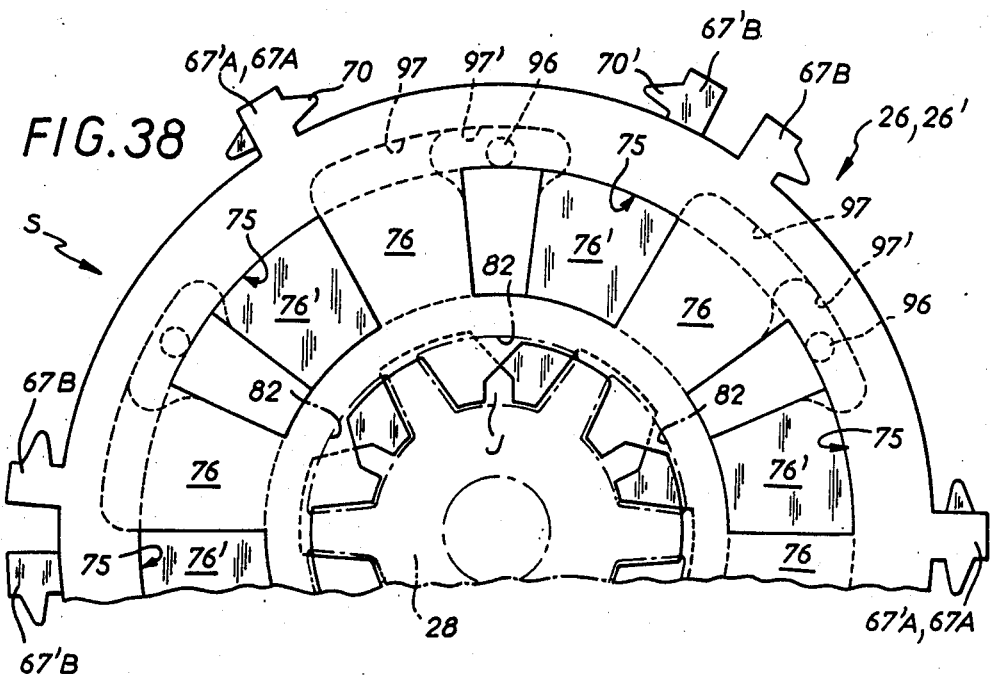
FIG. 38 is a partial schematic view in elevation showing the relative interleaving of the various component parts shown in the foregoing figures 32 through 37.

It must therefore be understood that, as shown schematically in FIG. 38, the hub counter-flange 26' seen in elevation has a configuration similar to that of the hub flange 26, except for an angular offsetting of its openings 75' and its engagement portions 76' relative to the openings 75 and the engagement portions 76 of the hub flange 26, for relative interpenetration, between the hub flange 26 and the hub counter-flange 26', of said engagement portions 76, 76' and said openings 75, 75'.

In practice, for such interpenetration to be possible, the engagement portions 76, 76' comprise radially, that is to say in a radial plane, at least one fold P and, likewise, the edges of the corresponding openings 75, 75' comprise radially, that is to say in a radial plane, at least one bend P, as shown.

As the hub flange 26 and the hub counter-flange 26' both have more or less convoluted configurations in the embodiment shown, to facilitate their installation in the space available, the edges of their openings 75, 75' and their engagement portions 76, 76' feature a plurality of bends in the radial direction.

The openings 75, 75' and the engagement portions 76, 76' thus provided on the flanges that the hub flange 26 and the hub counter-flange 26' constitute form meshing means with clearance 78 for said flanges.

Figure 39:
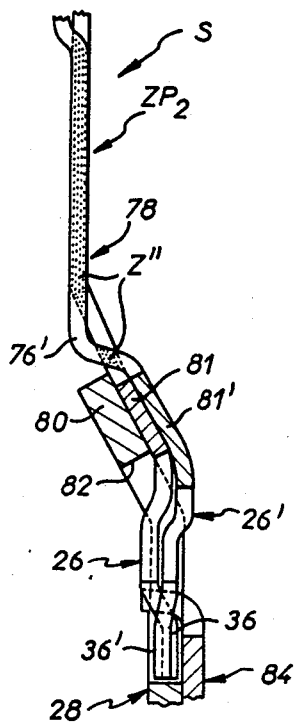
FIGS. 39, 40, 41 are partial views in axial cross-section showing, shaded, the areas of interaction between these various components.
Figure 40:
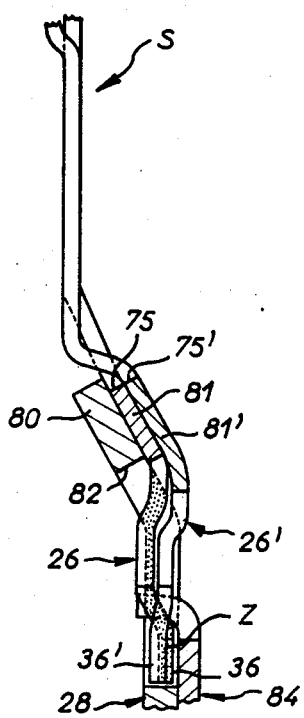
Figure 41:
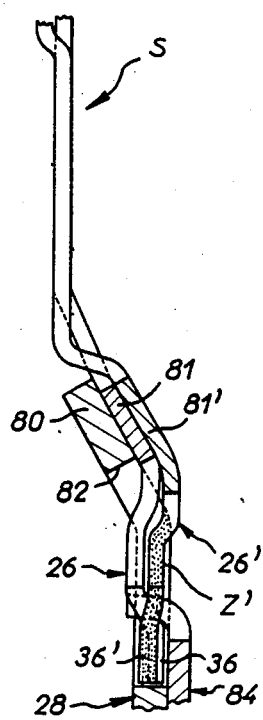

In FIG. 39 there are schematically represented by shading the action areas Z" through which the edges of these engagement portions 76, 76' and these openings 75, 75' interact to constitute the meshing means with clearance 78.

In practice it is through the meshing means with clearance 78 thus constituted that, during the second phase of operation, that is to say the second phase of relative angular displacement between the coaxial parts A and B, there is (along the straight line $II_T$ or $II_R$ of the diagram in FIG. 25) circumferential driving of one of the flanges that the hub flange 26 and the hub counter-flange 26' constitute by the other.

Thus, as previously, such circumferential driving action is obtained by virtue of an interpenetration area, in this instance the intermediate interpenetration area ZP2, of the hub flange 26 and the hub counter-flange 26'.

As previously, the hub 25 comprises a transverse flange or intermediate flange 28 shown in isolation in FIGS. 32 and 33 and forming part of the meshing means with clearance 27, 27'.

In the embodiment shown, the intermediate flange 26 features, circumferentially, at least one circumferentially continuous bar 80 against which the flanges that the hub flange 26 and the hub counter-flange 26' constitute bear axially, the hub flange 26 directly and the hub counter-flange 26' indirectly, through the intermediary of the hub flange 26.

In practice this circumferentially continuous bar 80 forms the outside periphery of the intermediate flange 28, that is to say its larger diameter periphery and, where they bear against it, the hub flange 26 and the hub counter-flange 26' each comprises, in line with it, a circumferentially continuous bar 81, 81'.

In the embodiment shown these circumferentially continuous bars 80, 81, 81' are oblique to the axis of the assembly.

In the case of the hub flange 26 and the hub counter-flange 26', the circumferentially continuous bars 81, 81' extend radially between, on the one hand, their openings 75, 75' and engagement portions 76, 76' and, on the other hand, the teeth 36, 36' which, as previously, they feature at their inside periphery, that is to say at their smaller diameter periphery.

For the purpose of acting with these teeth 36, 36', or in other words to form part of the corresponding meshing means with clearance 27, 27', the intermediate flange 28 comprises circumferentially spaced openings 82 (FIGS. 32, 33 and 38 through 41).

To permit radial insertion of the teeth 36, 36' of the hub flange 26 and the hub counter-flange 26' into these openings 82 in the intermediate flange 28, the edges of these openings 82 comprise radially, that is to say in a radial plane, as shown, at least one bend P.

In line with the meshing means with clearance 27, 27' there is again, as previously, an interpenetration area ZP1, but, differing from the previous arrangement, this affects only the free end of the corresponding teeth 36, 36' of the hub flange 26 and the hub counter-flange 26'.

In other words, in the embodiment shown in FIGS. 28 through 41, it is only at their free end that the action area Z, Z' of the teeth 36, 36' of the hub flange 26 and the hub counter-flange 26' are at least n part in substantial circumferential alignment with each other.

The other part of the teeth 36, 36', on the other hand, extend in different transverse planes, all or part of the contour of their edge being superposed in an axial plane, that of FIGS. 28, 31 and 39 through 41, to the contour of the edge of the corresponding opening 82 in the intermediate flange 28.

Furthermore, in this embodiment, although as previously the teeth 36 of the hub flange 26, for example, are, in the rest configuration of the assembly, in circumferential bearing engagement against the hub 25, more precisely against the intermediate flange 28 of the latter, for a first circumferential direction, whereas, conjointly, the teeth 36' of the hub counter-flange 26' are in circumferential bearing engagement against the intermediate flange 28 in the opposite circumferential direction, a tooth 36 of the hub flange 26 and a tooth 36' of the hub counter-flange 26' being conjointly inserted to this end into the same opening 82 in the intermediate flange 28, at opposite circumferential ends of the latter (FIG. 38) the circumferential clearance J between the teeth 36, 36' is made sufficiently large for their free ends never to come into circumferential contact with each other during relative angular displacement between the coaxial parts A and B in spite of their axial interpenetration, the circumferential driving of one of the flanges that the hub flange 26 and the hub counter-flange 26' constitute by the other occurring, as indicated previously, by virtue of their openings 75, 75' and their engagement portions 76, 76'.

Thus the axial interpenetration of the free ends of the teeth 36, 36' of the hub flange 26 and the hub counter-flange 26' has in this case no other function, in the interpenetration area ZP1 concerned, than to reduce the overall axial size of the assembly at this level.

Preferably, and as shown, the intermediate flange 28 and the flanges that the hub flange 26 and the hub counter-flange 26' constitute form part of a sub-assembly S shown in isolation in FIG. 31 in particular, a portion at least of said flanges, in practice that defined by the teeth 36, 36', being axially disposed between said intermediate flange 28, more precisely the circumferentially continuous bar 80 of the latter, on the one hand, and an annular plate 84 attached to the intermediate flange 28.

In the embodiment shown, this annular plate 84 is attached to the intermediate flange 28 by rivets 85, on the side of the intermediate flange opposite that from which its circumferentially continuous bar 80 projects obliquely.

As an alternative to this, and as is also shown, this annular plate 84 may feature along its outside periphery, that is to say along its larger diameter periphery, lugs 86 which extend axially and which, for the purpose of crimping it to the intermediate flange 28, are engaged in openings provided for this purpose in the latter, instead of the previous rivets 85.

Also, in this embodiment, this annular plate 84 serves as a bearing plate for the flange 87 carrying the blades 24 of the turbine wheel 13 (FIG. 28).

It therefore preferably has an appropriate surface coating 88, such as a layer of copper, for example.

The hub 89 proper, that is to say that axial part of the hub 25 to which is attached the intermediate flange 28, is also of course part of the sub-assembly S.

In the embodiment shown, the intermediate flange 28 is attached by welding to the transverse flange 31, in this instance to the reduced radial extension of the flange proper 89.

In the embodiment shown in FIGS. 28 through 41 the housings 61A, 61B provided on the guide ring 45 for the springs 60A, 60B are stamped portions, like the corresponding housings 61′A, 61′B of the guide ring 45′.

Furthermore, at assembly time, it is through the edge of these housings 61A, 61B radially farthest from the axis of the assembly that the bearing engagement of the guide ring 45 on the generally transverse wall 12 of the cover 10 is preferably achieved, over and above its bearing engagement previously obtained through its inside periphery 47, in this instance substantially plane, when fitted into the latter.

Also, in the embodiment shown, the axial extension 49 of the guide ring 45 features, not mortises, as previously, but tenons $58_1$.

In this embodiment the assembly is fastened to the cover 11 as previously by means of "dogs" 50, not visible in the figures, through the intermediary of the guide ring 45′, rather than through the intermediary of the guide ring 45.

To this end the axial extension 49′ of the guide ring 45′ extends not towards the generally transverse wall 12 of the cover 10 but away from the generally transverse wall 12, in contact with the associated generally cylindrical wall 11.

Also, the guide ring 45′ features spaced openings adapted to have the tenons $58_1$ of the guide ring 45 pass through them and, beyond these openings (not visible in the figures), these tenons $58_1$ are crimped as shown in unbroken line in FIG. 28.

Finally, in the embodiment shown, the guide ring 45′ has no stiffening fold at its inside periphery, that is to say its smaller diameter periphery.

As for the rest, the arrangements are of the type previously described and the operation is similar.

Figure 42:
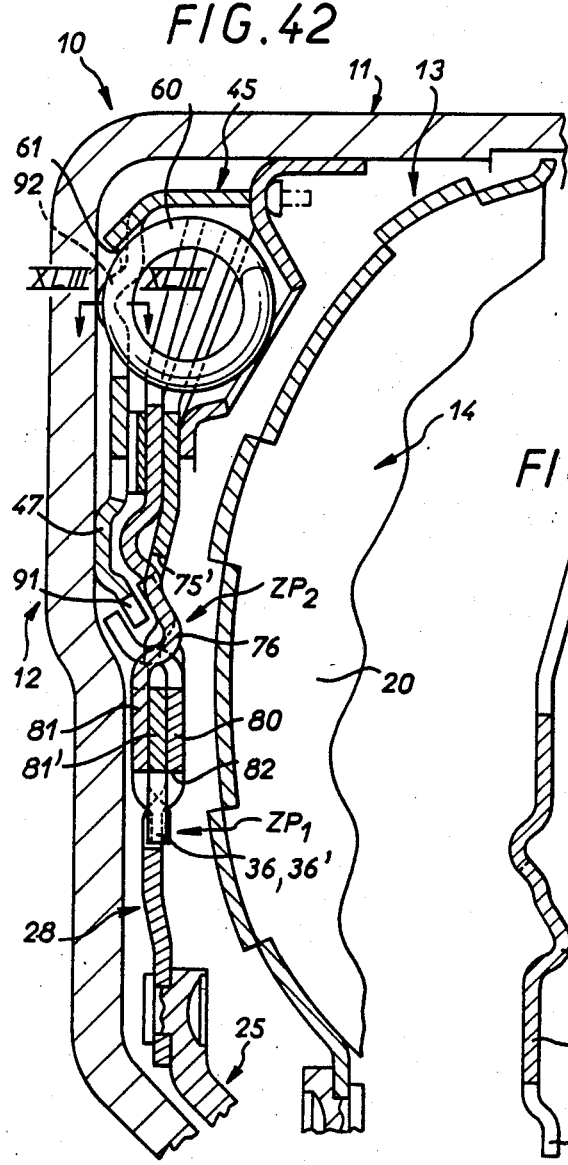
FIG. 42 is a partial view in axial cross-section analogous to that of FIG. 2 for another embodiment of the torsional damper device in accordance with the invention.
Figures 44, 45:
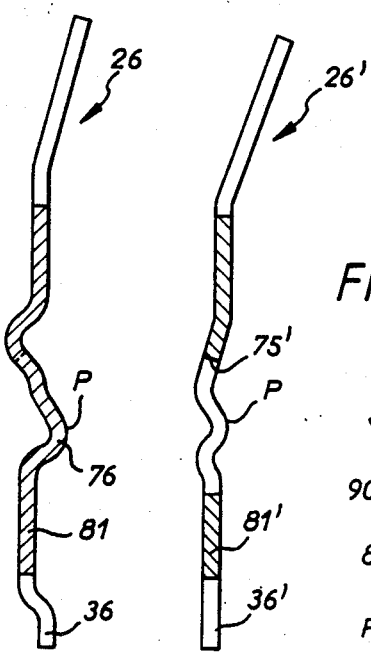
FIGS. 44, 45, 46 are partial views in axial cross-section of various component parts of this torsional damper device.
Figure 46:
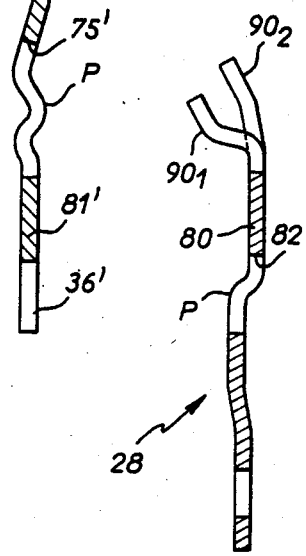
Figure 43:
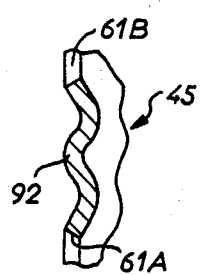
FIG. 43 is a partial view of it in circumferential cross-section on the line XLIII—XLIII in FIG. 42.

In the embodiment shown in FIG. 42 the intermediate flange 28 which in the embodiment shown in FIGS. 1 through 24 is crimped to a flange 31 of the hub 25 of relatively great radial extent still comprises, as in the embodiment shown in FIGS. 28 through 41, a circumferentially continuous flange 80 for axial bearing engagement with the hub flange 26 and the hub counter-flange 26′, said hub flange 26 and said hub counter-flange 26′ themselves comprising to this end circumferentially continuous flanges 81, 81′; however, at its largest diameter periphery, that is to say at the periphery of this circumferentially continuous bar 80, the intermediate flange 28 features spaced radial teeth $90_1$, $90_2$ which are alternately offset axially, in a first axial direction for the teeth $90_1$ and in the opposite axial direction for the teeth $90_2$, and by means of which, by virtue of a bayonette type coupling, it surrounds the inside periphery, that is to say the smallest diameter periphery, of that of the guide rings 45, 45′ to which it is axially opposed relative to the flanges that the hub flange 26 and the hub counter-flange 26′ constitute and thus, in this instance, of the guide ring 45, said smallest diameter periphery of this guide ring 45 having itself to this end spaced teeth 91.

In other words, the teeth $90_1$ of the intermediate flange 28 are on a first side of the teeth 91 of the guide ring 45, between the latter and the generally transverse wall 12 of the cover 10, and the teeth $90_2$ of the intermediate flange 28 are on the other side of the teeth 91.

As in the embodiment shown in FIGS. 42 through 46 two interpenetration areas are provided between the hub flange 26 and the hub counter-flange 26′, one of these, ZP1, affecting only the free end of the teeth 36, 36′ of the hub flange 26 and the hub counter-flange 26′, all being inserted by their free end in the openings 82 in the intermediate flange 28 with a circumferential clearance relative to each other in the rest position sufficient for them not to come into contact with each other on relative angular displacement of the coaxial parts A and B, the other interpenetration area, ZP2, concerning the openings 75, 75′ and engagement portions 76, 76′, with bend P, of the hub flange 26 and the hub counter-flange 26′.

In practice in the embodiment shown these interpenetration areas ZP1, ZP2 are operative substantially level with the median area 20, or swelling, of the blades 14 of the turbine wheel 13, one on each side thereof.

As is readily understood the bayonette type coupling provided between the intermediate flange 28 and the guide ring 45 advantageously permits appropriate axial retention of the hub flange 26 and the hub counter-flange 26′ relative to the guide ring 45 previously fitted into the cover 10 and therefore relative to the assembly at assembly time, prior to intervention of the "dogs" 50 on the guide ring 45′ and subsequently in operation.

Moreover, in the embodiment shown in FIGS. 42 through 46, the bearing engagement of the guide ring 45 on the generally transverse wall 12 of the cover 10 is achieved, apart from its inside periphery 47, that is to say its smallest diameter periphery, through bosses 92 projecting axially from the guide ring 45 between the housings 61A, 61B that it features for the springs 60A, 60B.

In the embodiment shown in FIG. 47, a bayonette type coupling is also provided between the intermediate flange 28 of the hub 25 and the guide ring 45 provided to this end with teeth 91 at its inside periphery, but, in order to do this, only the teeth $90_1$ are specially provided on the intermediate flange 28, the bayonette type coupling in question being implemented, for the latter, in addition to these teeth, by virtue of its main part, at the level of its openings 82; in other words, in a case such as this, said main part forms of itself the equivalent of the foregoing teeth $90_2$.

Also, in this embodiment, there is provided only one interpenetration area ZP1 for the hub flange 26 and the hub counter-flange 26′, slightly beyond, in the radial direction, the median area 20, or swelling, of the blades 14 of the turbine wheel 13 relative to the axis of the assembly, the teeth 36, 36′ of the hub flange 26 and the hub counter-flange 26′ to this end entering the openings 32 in the intermediate flange 28.

As previously, the intermediate flange 28 forms at its inside periphery a circumferentially continuous bar 81 for axial bearing engagement with the hub flange 26 and the hub counter-flange 26', on the side of the hub flange 26 and the hub counter-flange 26' opposite the guide ring 45.

FIG. 48 gives another possible configuration for two interpenetration areas ZP1, ZP2 between the hub flange 26 and the hub counter-flange 26', to illustrate the diverse application possibilities of the invention.

In the foregoing description it has been assumed that the arrangements adopted are operative symmetrically relative to the idle configuration of the assembly for both "upshift" and "downshift" operation.

This is not necessarily the case, of course.

To the contrary, and as schematically represented in chain-dotted line in the diagram of FIG. 25, the slope of the straight line $I_R$ representing "downshift" operation may, for example, be reduced, by half for example, either by using appropriately different relatively low stiffness springs 60A, certain of which are operative only in "upshift" mode and others only in "downshift" mode, or by eliminating one or two of the arms 67'A of the hub counter-flange 26', so as to render inoperative in "downshift" mode the relatively low stiffness springs 60A to which the latter normally relate.

Also, the present invention is not limited to the embodiments described and shown, but encompasses any variant and/or combination of the various component parts.

In particular, there may be provided pegs projecting axially from the transverse wall of the cover adapted to centre the torsional damper device in said cover prior to attachment to the latter of one of its coaxial parts, or even at the time of such attachment, said pegs then forming to this end rivets, and keyhole slots being provided for the head of the latter in the hub flange and the hub counter-flange, so as not to interfere with them, as schematically represented in chain-dotted line in FIG. 38, at 96 for the pegs in question and at 97, 97' for the corresponding keyhole slots.

Conjointly with this, the attaching together of the two flanges that the part in question of the torsional damper device usually comprises is not necessarily achieved by means of mortises and tenons, but may instead be achieved, for example, by axial spacers linking these two flanges to each other.

Also, consideraion may be given with regard to the friction needed to achieve hysteresis, to axial prestressing at assembly time of the hub flange and the hub counter-flange, said hub flange and said hub counter-flange then behaving like Belleville spring washers, which may make it possible to eliminate the need to use any form of special axially acting springs for this purpose.

Finally, instead of comprising only two coaxial parts, the torsional damper device may comprise a larger number thereof, three for example, a first stage of relatively low stiffness being added, for example, to further increase the range of relative angular displacement at low values of torque.

We claim:

1. Torsional damper device, particularly for automotive vehicles, said device being of the kind comprising at least two coaxial parts disposed to rotate relative to each other within defined limits of relative angular displacement against circumferentially acting elastic means operative circumferentially between said parts for at least part of such relative angular displacement, said two parts including a first part comprising a hub and two flanges, said two flanges including a hub flange and a hub counter-flange, each of said two flanges forming an annular part around said hub, and each of said two flanges meshing with said hub through meshing means with clearance in a rest configuration of the device, an alternating arrangement wherein said meshing means with clearance between said hub and said hub flange are in circumferentially abutting relationship in one circumferential direction and said meshing means with clearance between said hub and said hub counter-flange are in circumferentially abutting relationship in an opposite circumferential direction, and said two parts including a second part comprising at least one member in the form of a guide ring also forming an annular part around said hub and being free to rotate relative to said hub in either circumferential direction, said torsional damper device being characterized in that, between inside and outside peripheries of said hub flange and said hub counter-flange there is at least one area of said hub flange and one area of said hub counter-flange where said hub flange and said hub counter-flange interpenetrate axially relative to each other, said area being an interpenetration area.

2. Torsional damper device according to claim 1, characterized in that there are action areas where said meshing means with clearance are operative between said hub and said hub flange and where said meshing means are operating between said hub and said hub counter-flange form part of a second interpenetration area, said action areas being at least in part in substantial circumferential alignment with each other.

3. Torsional damper device according to claim 2, characterized in that said hub includes a transverse intermediate flange forming part of said meshing means with clearance, and said action areas of said meshing means with clearance are both confined within the thickness of said intermediate flange.

4. Torsional damper device according to claim 3, characterized in that said meshing means with clearance for said hub flange, said hub counter-flange and said intermediate flange include teeth, and a main part of both said hub flange and said hub counter-flange are generally parallel to one another, and said teeth of at least one of said two flanges are at least partially offset axially towards the other flange relative to its main part.

5. Torsional damper device according to claim 4, characterized in that said teeth of both said hub flange and of said hub counter-flange are at least partially offset one towards the other relative to their main part.

6. Torsional damper device according to claim 4, characterized in that said teeth of said intermediate flange are also at least partially offset axially.

7. Torsional damper device according to claim 4, characterized in that said teeth of said hub flange alternate circumferentially with said teeth of said hub counter-flange.

8. Torsional damper device according to claim 1 characterized in that, radially spaced from their inside periphery, said hub flange and said hub counter-flange selectively define at least one of an interpenetration area and an intermediate interpenetration area.

9. Torsional damper device according to claim 8, characterized in that, along the length of said intermediate interpenetration area, at least one flange of said two flanges has at least one opening, and the other of said two flanges has an engagement portion, engaged axially in said opening.

10. Torsional damper device according to claim 9, characterized in that said engagement portion comprises radially at least one bend.

11. Torsional damper device according to claim 9, characterized in that the edges of said opening comprise radially at least one bend.

12. Torsional damper device according to claim 9, characterized in that at least one of said two flanges includes circumferentially alternating engagement portions and openings.

13. Torsional damper device according to claim 12, characterized in that each of said two flanges include circumferentially alternating engagement portions and openings, and the arrangement of said engagement portions and openings is the same for both of said two flanges.

14. Torsional damper device according to claim 9, characterized in that the openings and engagement portions provided on said two flanges form meshing means with clearance for said two flanges.

15. Torsional damper device according to claim 1, characterized in that, said hub has a transverse intermediate flange forming part of said meshing means with clearance, said intermediate flange comprises, circumferentially, at least one circumferentially continuous bar against which said two flanges are in axial bearing engagement, said two flanges each comprising, in line with said circumferentially continuous bar of said intermediate flange a circumferentially continuous bar.

16. Torsional damper device according to claim 15, characterized in that said circumferentially continuous bar of said intermediate flange forms a largest diameter periphery of said intermediate flange.

17. Torsional damper device according to claim 15, characterized in that said intermediate flange has openings for said meshing means with clearance with said hub flange and with said hub counter-flange.

18. Torsional damper device according to claim 17, characterized in that the edges of the openings in said intermediate flange include, radially, at least one bend for engagement by said teeth of said hub flange and said hub counter-flange.

19. Torsional damper device according to claim 15, characterized in that said intermediate flange and said two flanges form part of a unitary sub-assembly, a portion at least of one of said flanges being axially disposed between said intermediate flange and an annular plate attached to said intermediate flange.

20. Torsional damper device according to claim 1, characterized in that, said hub has a transverse intermediate flange forming part of said meshing means with clearance, said intermediate flange has, at its largest diameter periphery, teeth which are alternately offset relative to each other, some in one axial direction and the other in the opposite axial direction, and said intermediate flange by way of said offset teeth and through a bayonette type coupling surrounds a smallest diameter periphery of said guide ring from which said intermediate flange is axially separated by said two flanges, said smallest diameter periphery of said guide ring having teeth forming part of said bayonette type coupling.

21. Torsional damper device according to claim 1, characterized in that, said circumferentially acting elastic means has two stages of elastic members of two different stiffnesses, arms on the outside periphery of said hub flange and said hub counter-flange acting on said elastic members, at least certain of said elastic members of a first of said two stages are associated in pairs with axial superposition of the corresponding arms of said hub flange and said hub counter-flange being between the two elastic members of said pair, and at least certain of said elastic members of a second of said two stages are each individually bracketed by two arms one of which forms part of said hub flange and the other forms part of said hub counter-flange.

22. Torsional damper device according to claim 1, characterized in that said circumferentially acting elastic means has, as elastic members, helical coil type springs, and there are associated with said springs retaining means for retaining said springs radially against centrifugal force.

23. Torsional damper device according to claim 21, characterized in that said circumferentially acting elastic means has, as elastic members, helical coil type springs, there are associated with said springs retaining means for retaining said springs radially against centrifugal force, and said retaining means comprise fingers projecting circumferentially from the arms of said hub flange and the arms of said hub counter-flange, and said springs are circumferentially engaged over said fingers.

24. Torsional damper device according to claim 23, characterized in that said fingers have free ends and said fingers are tapered towards said free ends.

25. Torsional damper device according to claim 21, characterized in that said circumferentially acting elastic means has, as elastic members, helical coil type springs, there are associated with said springs retaining means for retaining said springs radially against centrifugal force, and said retaining means comprise a ring over which said springs are engaged, and said ring is keyed radially to at least certain of said arms of said hub flange and arms of said hub counter-flange.

26. Torsional damper device according to claim 25, characterized in that for radial keying of said ring each of the engaged ones of said arms has a bend.

27. Torsional dampr device according to claim 1, characterized in that there are two of said guide rings and said guide rings lie one on either side of said hub flange and said hub counter-flange, means constrain said two guide rings to rotate with one another, axially acting elastic means bearing on one of said guide rings for urging said hub flange and said hub counter-flange towards each other, at least one of said guide rings has an annular fold directed away from the other of said guide rings for stiffening said one guide ring substantially in line with said axially acting elastic means.

28. Torsional damper device according to claim 27, characterized in that at least one of said guide rings has an axial extension at its outside periphery.

29. Torsional damper device according to claim 1, characterized in that at the level of said interpenetration area one of said two flanges has means for driving the other of said two flanges circumferentially on relative angular displacement, said drive means driving said hub counter-flange by said hub flange for a first circumferential direction and said drive means driving said hub flange by said hub counter-flange for the opposite circumferential direction.

30. Hydraulic coupling device having a turbine wheel and equipped with a torsional damper device, particularly for automotive vehicles, said device being of the kind comprising at least two coaxial parts disposed to rotate relative to each other within defined limits of relative angular displacement against circumferentially acting elastic means operative circumferentially between said parts for at least part of such relative angular displacement, said two parts including a first part comprising a hub and two flanges, said two flanges including a hub flange and a hub counter-flange, each of said two flanges forming an annular part around said hub and each of said two flanges meshing with said hub through meshing means with clearance in a rest configuration of the device an alternating arrangement wherein said meshing means with clearance between said hub and said hub flange are in circumferentially abutting relationship in one circumferential direction and said meshing means with clearance between said hub and said hub counter-flange area in circumferentially abutting relationship in an opposite circumferential direction, and said two parts including a second part comprising at least one member in the form of a guide ring also forming an annular part around said hub and being free to rotate relative to said hub in either circumferential direction, said hydraulic coupling device being characterized in that, between inside and outside peripheries of said hub flange and said hub counter-flange there is at least one area of said hub flange and one area of said hub counter-flange where said hub flange and said hub counter-flange interpenetrate axially relative to each other, said area being an interpenetration area.

31. Hydraulic coupling device according to claim 10, characterized in that said turbine wheel has a swelling and said meshing means with clearance extend radially slightly beyond the swelling of said turbine wheel relative to an axis of the device in the vicinity of said swelling, and only said intermediate flange of said hub extending in line with said swelling.

32. Hydraulic coupling device according to claim 30, characterized in that said turbine wheel has a swelling and said meshing means with clearance extend between the swelling of said turbine wheel and an axis of the device.

33. Hydraulic coupling device according to claim 30, characterized in that said turbine wheel has a swelling and said interpenetration area is in line with the swelling of said turbine wheel.

* * * * *